(12) United States Patent  (10) Patent No.: US 7,558,337 B2
Ma et al.  (45) Date of Patent: Jul. 7, 2009

(54) SYSTEMS, METHODS, AND APPARATUS FOR IMPULSE NOISE MITIGATION

(75) Inventors: Xiaoqiang Ma, Newtown, PA (US); Azzedine Touzni, Doylestown, PA (US)

(73) Assignee: ATI Technologies, Inc., Markham, Ontario (CA)

( * ) Notice: Subject to any disclaimer, the term of this patent is extended or adjusted under 35 U.S.C. 154(b) by 597 days.

(21) Appl. No.: 11/329,227

(22) Filed: Jan. 11, 2006

(65) Prior Publication Data

US 2007/0036239 A1 Feb. 15, 2007

Related U.S. Application Data

(60) Provisional application No. 60/707,535, filed on Aug. 12, 2005.

(51) Int. Cl.
H04L 27/00 (2006.01)
(52) U.S. Cl. ..................................................... 375/316
(58) Field of Classification Search ................. 375/260, 375/278, 284, 285, 316, 324, 335, 340, 346, 375/347, 349
See application file for complete search history.

(56) References Cited

U.S. PATENT DOCUMENTS

| 6,799,193 | B2 | 9/2004 | Kilani et al. | |
|---|---|---|---|---|
| 6,834,079 | B1 | 12/2004 | Strait et al. | |
| 6,928,120 | B1* | 8/2005 | Zhang | 375/260 |
| 7,382,717 | B2* | 6/2008 | Park | 370/203 |
| 2004/0008614 | A1 | 1/2004 | Matsuoka et al. | |
| 2004/0085891 | A1 | 5/2004 | Henriksson | |
| 2005/0163262 | A1* | 7/2005 | Gupta | 375/343 |
| 2006/0023804 | A1* | 2/2006 | Magee et al. | 375/267 |
| 2006/0251198 | A1 | 11/2006 | Ma et al. | |
| 2007/0098090 | A1 | 5/2007 | Ma et al. | |

FOREIGN PATENT DOCUMENTS

| EP | 0 930 719 A2 | 7/1999 |
|---|---|---|
| EP | 0930719 A2 | 7/1999 |
| EP | 1 043 874 A2 | 10/2000 |
| EP | 1043874 A2 | 10/2000 |
| EP | 1 128 550 A2 | 8/2001 |
| EP | 1128550 A2 | 8/2001 |
| EP | 0 930 719 A3 | 9/2001 |

(Continued)

OTHER PUBLICATIONS

Abdelkefi, F. et al. Impulsive noise cancellation in multicarrier transmission. Accepted for IEEE Trans. on Comm. Draft dated Apr. 12, 2004. pp. 1-29.

(Continued)

*Primary Examiner*—Sam K Ahn
(74) *Attorney, Agent, or Firm*—Volpe and Koenig, P.C.

(57) ABSTRACT

A method of signal processing according to one of several embodiments includes estimating a deterministic component of a received signal. The estimating is based on an estimated response of a transmission channel. Based on the estimated deterministic component, a non-deterministic component of the received signal is estimated. Based on corrupted portions of the estimated non-deterministic component, a noise estimate is obtained, and the received signal is compensated based on the noise estimate. A method according to another embodiment includes replacing received samples at corrupted locations with values from a calculated model.

23 Claims, 28 Drawing Sheets

FOREIGN PATENT DOCUMENTS

| EP | 0930719 A3 | 9/2001 |
|---|---|---|
| EP | 1 180 851 A2 | 2/2002 |
| EP | 1 180 851 A3 | 2/2002 |
| EP | 1180851 A2 | 2/2002 |
| EP | 1180851 A3 | 2/2002 |
| EP | 1 128 550 A3 | 10/2003 |
| EP | 1128550 A3 | 10/2003 |
| JP | 11-355240 | 12/1999 |
| WO | 03/047196 A2 | 6/2003 |
| WO | WO 03/047196 A2 | 6/2003 |
| WO | 03/073683 | 9/2003 |

OTHER PUBLICATIONS

Armstrong, J. et al. Impulse Noise Mitigation for OFDM Using Decision Directed Noise Estimation. Accepted for ISSSTA Aug./Sep. 2004, Sydney, AU. 5 pp.

Armstrong, J. et al. Optimum Noise Thresholds in Decision Directed Impulse Noise Mitigation for OFDM. Accepted for CSNDSP 2004, Jul. 2004, Newcastle upon Tyne, UK. 4 pp.

Ghosh, M. Analysis of the Effect of Impulse Noise on Multicarrier and Single Carrier QAM Systems. IEEE Trans. Comm. v.44 n.2 Feb. 1996 pp. 145-147.

Ma, X. et al. Iterative Channel Estimation for OFDM with Clipping. WPMC 2002, 5th Int'l. Symp. Wireless Personal Multimedia Comm. 5 pp.

Nikookar, H. et al. Performance evaluation of OFDM transmission over impulsive noisy channels. PIMRC 2002, 13th IEEE Int'l. Symp. Personal, Indoor and Mobile Radio Comm. 5 pp.

Nilsson, R. Doctoral Thesis, Part 6: Combating Impulse Noise in DMT-based VDSL Systems. cover and pp. 143-156. Lulea Tekniska Universitet, 2001:40.

Nilsson, R. et al. A Rank-Reduced LMMSE Canceller for Narrowband Interference Suppression in OFDM-Based Systems. IEEE Trans. Comm. v.41 n.12 Dec. 2003 pp. 2126-2140.

Sjoberg, F. et al. Digital RFI Suppression in DMT-Based VDSL Systems. IEEE Trans. Circ. Syst.-I., 2004. pp. 1-13.

Sliskovic, M. Signal processing algorithm for OFDM channel with impulse noise. Proc. IEEE ICECS 2000, Lebanon, Dec. 2002. pp. 222-225.

Suraweera, H. et al. Analysis of Impulse Noise Mitigation Techniques for Digital Television Systems. Proc. 8th Int'l OFDM Workshop, Hamburg, DE, Sep. 2003, 5 pp.

Zhidkov, S. Impulsive Noise Suppression in OFDM Based Communication Systems. IEEE Trans. Cons. Elect. v.49 n.4 Nov. 2003 pp. 944-948.

Kim, D. Orthogonal Frequency Division Multiplexing for Digital Broadcasting. PhD thesis, Ga. Inst. Tech., Nov. 1998. Cover and Chapter 7 (pp. 110-122).

Abdelkefi et al., "Impulsive Noise Cancellation in Multicarrier Transmission", Accepted for IEEE Trans. on Comm., pp. 1-29, (Draft Dated Apr. 12, 2004).

Armstrong et al., "Optimum Noise Thresholds in Decision Directed Impulse Noise Mitigation for OFDM", Accepted for CSNDSP 2004, Newcastle upon Tyne, (United Kingdom, Jul. 2004).

Armstrong et al., "Impulse Noise Mitigation for OFDM Using Decision Directed Noise Estimation", Accepted for ISSSTA Aug./Sep. 2004, (Sydney, Australia, 2004).

European Broadcasting Union, "Digital Video Broadcasting (DVB); Framing Structure, Channel Coding and Modulation for Digital Terrestrial Television", Final Draft ETSI EN 300 744, V1.5.1, (Jun. 2004).

European Broadcasting Union, "Digital Video Broadcasting (DVB); Transmission System for Handheld Terminals (DVB-H)", ETSI EN 302 304 V1.1.1, (Nov. 2004).

Ghosh, "Analysis of the Effect of Impulse Noise on Multicarrier and Single Carrier QAM Systems", IEEE Trans. Comm. vol. 44, No. 2, pp. 145-147, (Feb. 1996).

Kim, "Orthogonal Frequency Division Multiplexing for Digital Broadcasting", PhD Thesis, GA. Inst. Tech, Cover and Chapter 7, pp. 110-122, (Nov. 1998).

Ma et al., "Iterative Channel Estimation for OFDM with Clipping", WPMC 2002. 5th Int'l Symp., Wireless Personal Multimedia Comm., (2002).

Nikookar et al., Performance Evaluation of OFDM Transmission over Impulsive Noisy Channels, PIMRC 2002, 13th IEEE Int'l Symp., Personal, Indoor and Mobile Radio Comm., (2002).

Nilsson et al., "A Rank-Reduced LMMSE Canceller for Narrowband Interference Suppression in OFDM-Based Systems", IEEE Trans. Comm., vol. 41, No. 12, pp. 2126-2140, (Dec. 2003).

Nilsson, "Part 6: Combating Impulse Noise in DMT-Based VDSL Systems", Doctoral Thesis, Lulea Teknisha Universitet, 2001:40, pp. 143-156.

Sjoberg et al., "Digital RFI Suppression in DMT-Based VDSL Systems", IEEE Trans. Circ. Syst.-I., pp. 1-13, (2004).

Sliskovic, "Signal Processing Algorithm for OFDM Channel with Impulse Noise", Proc. IEEE ICECS 2000, pp. 222-225, (Lebanon, Dec. 2002).

Suraweera et al., "Analysis of Impulse Noise Mitigation Techniques for Digital Television Systems", Proc. 8th Int'l OFDM Workshop, (Hamburg, DE, Sep. 2003).

Zhidkov, "Impulsive Noise Suppression in OFDM Based Communication Systems", IEEE Trans. Cons. Elect., vol. 49, No. 4, pp. 944-948, (Nov. 2003).

* cited by examiner

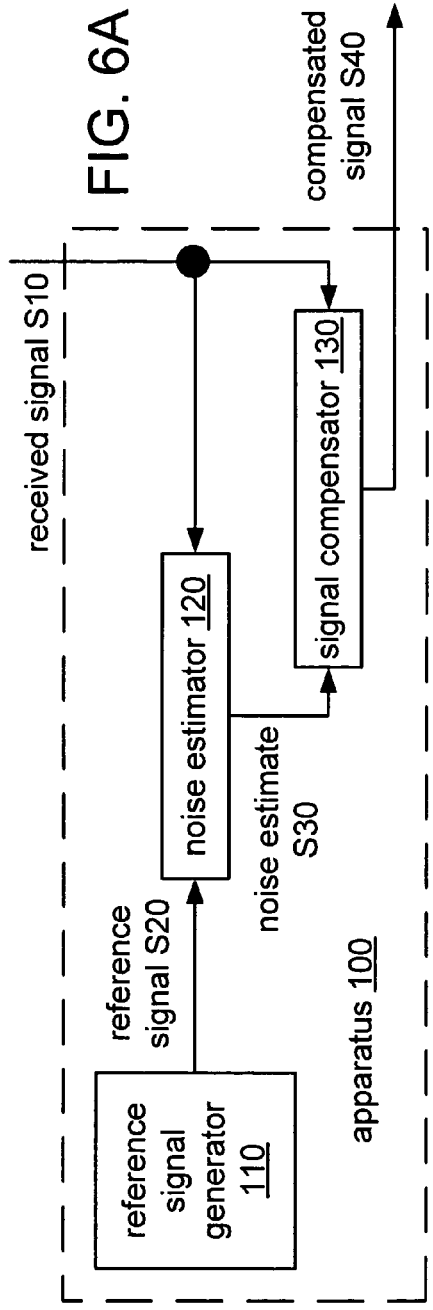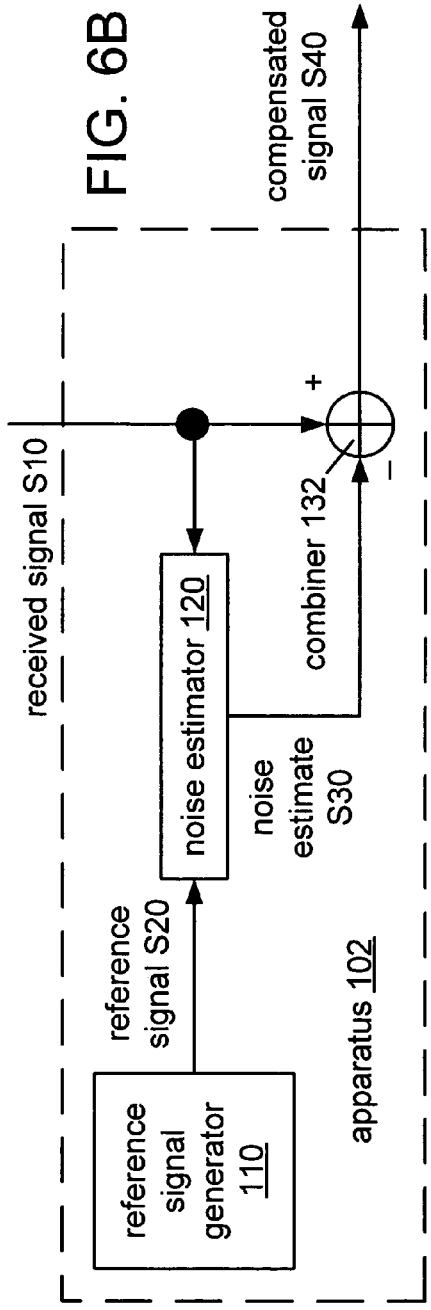

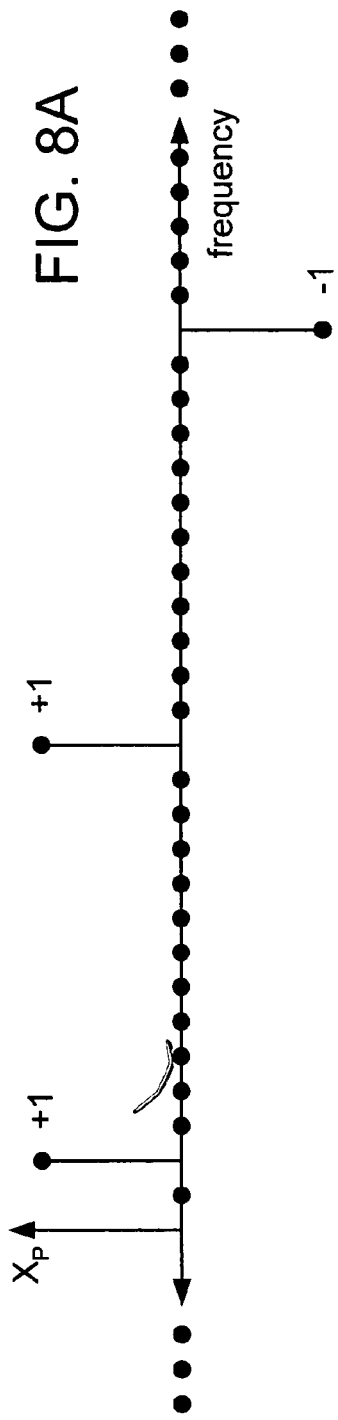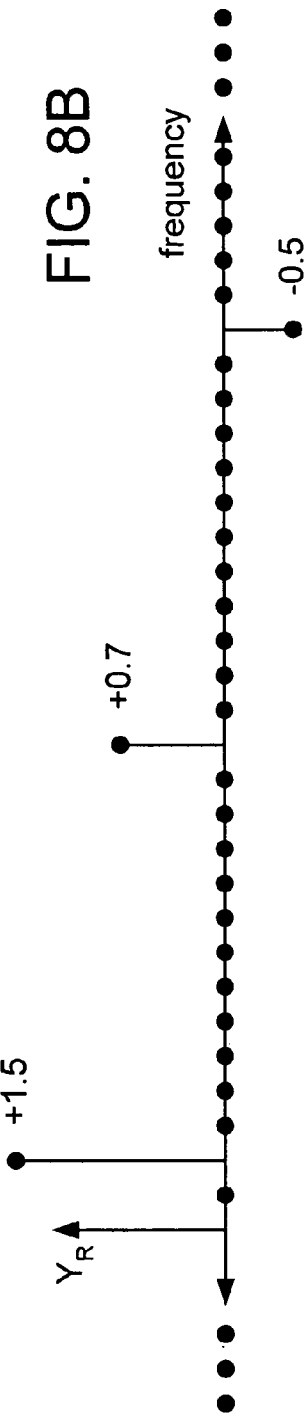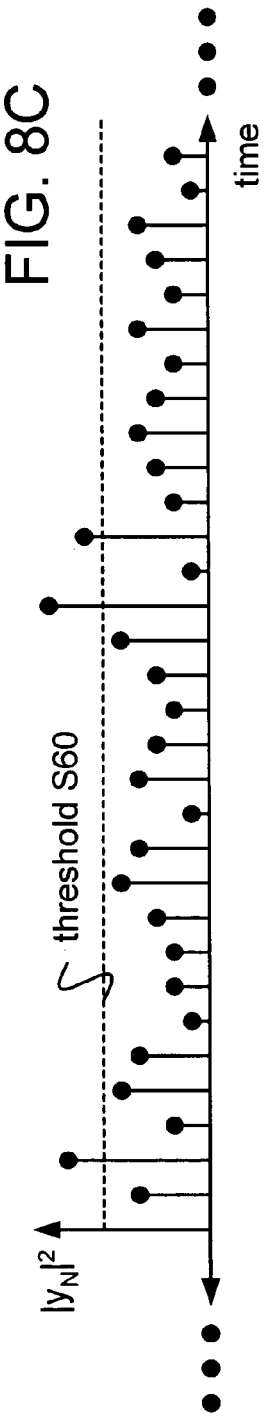

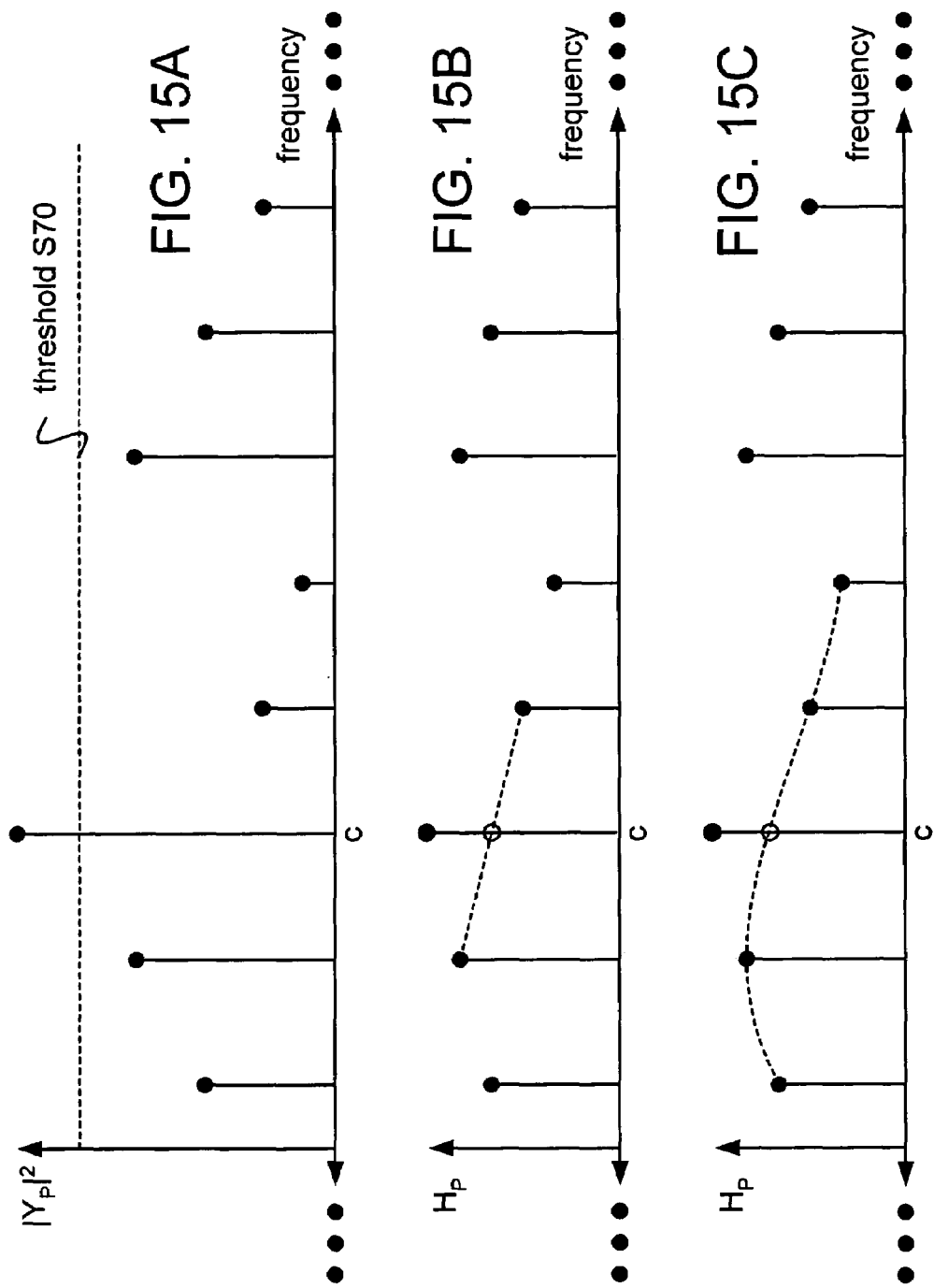

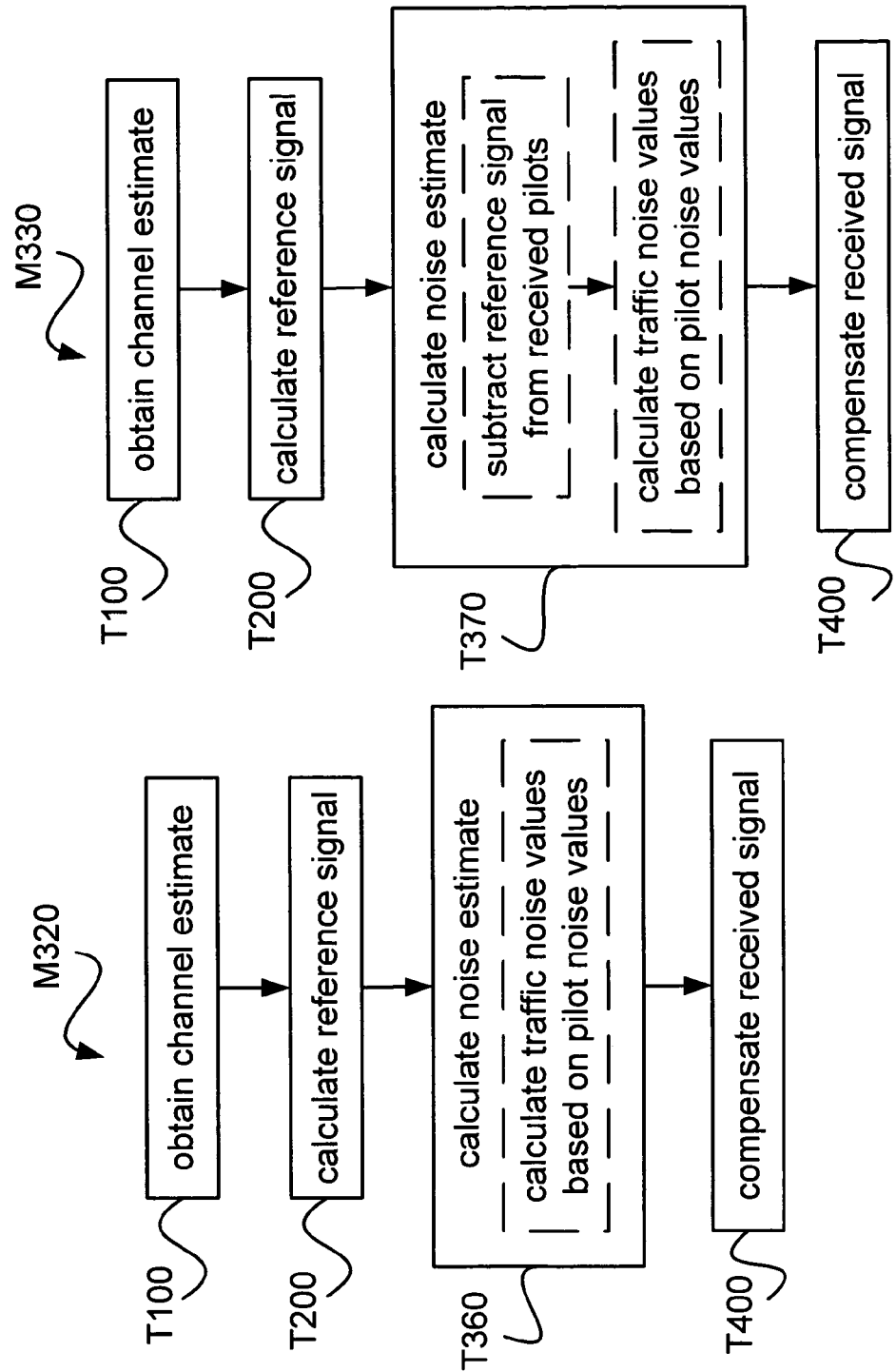

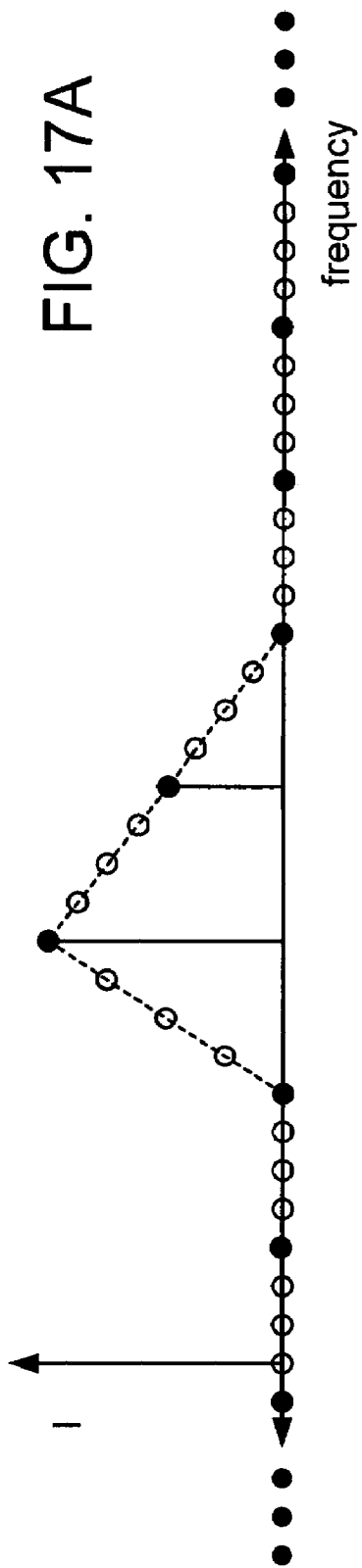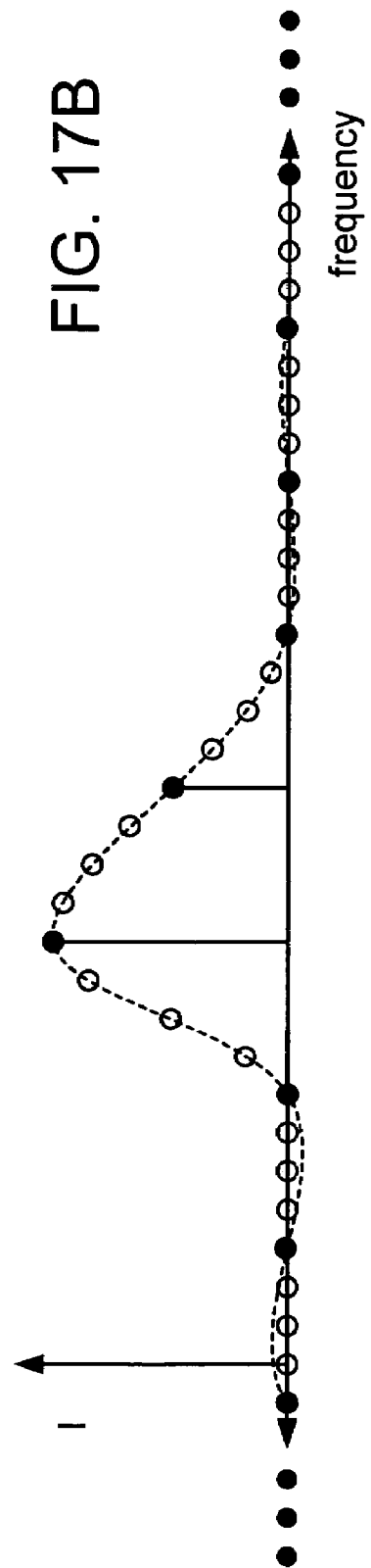

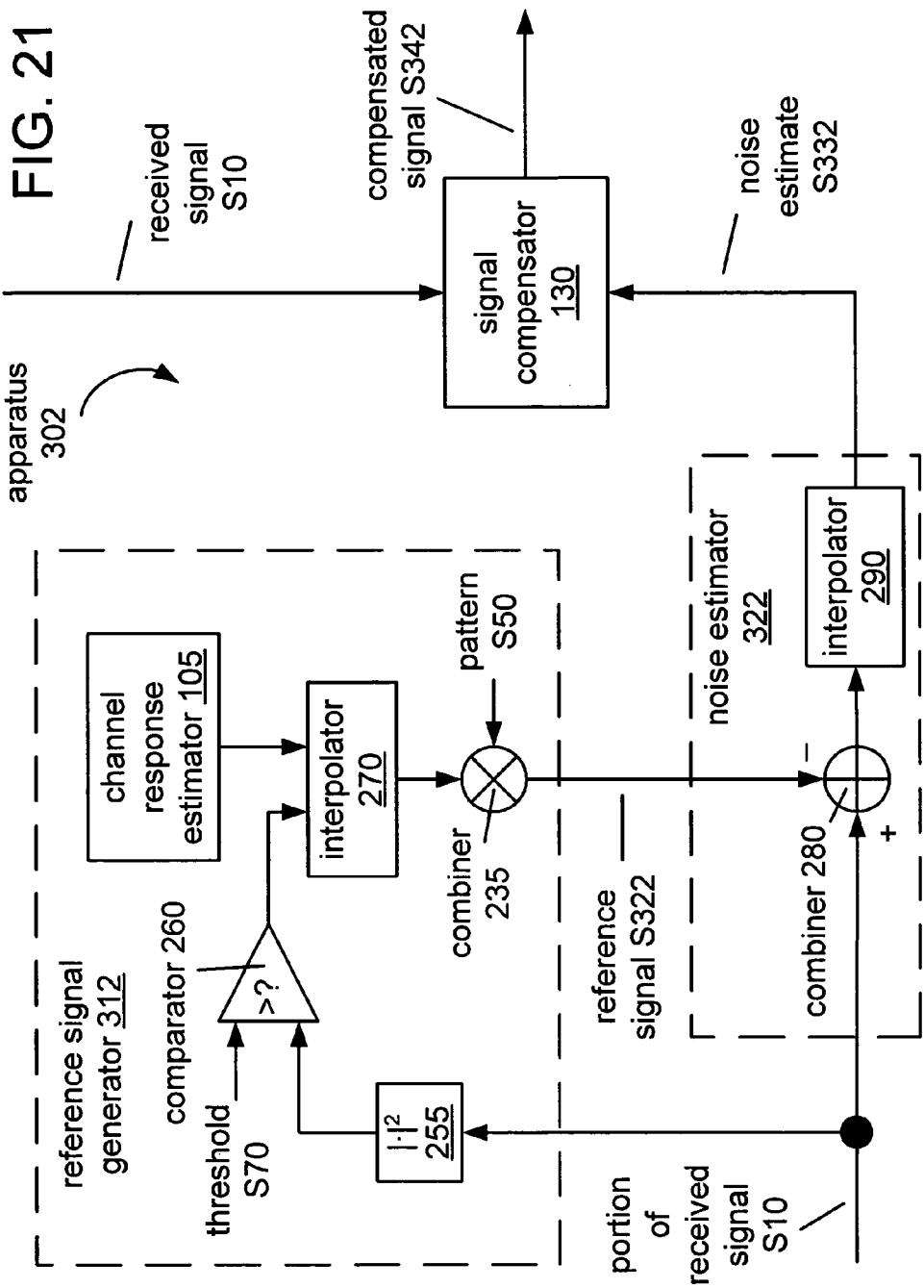

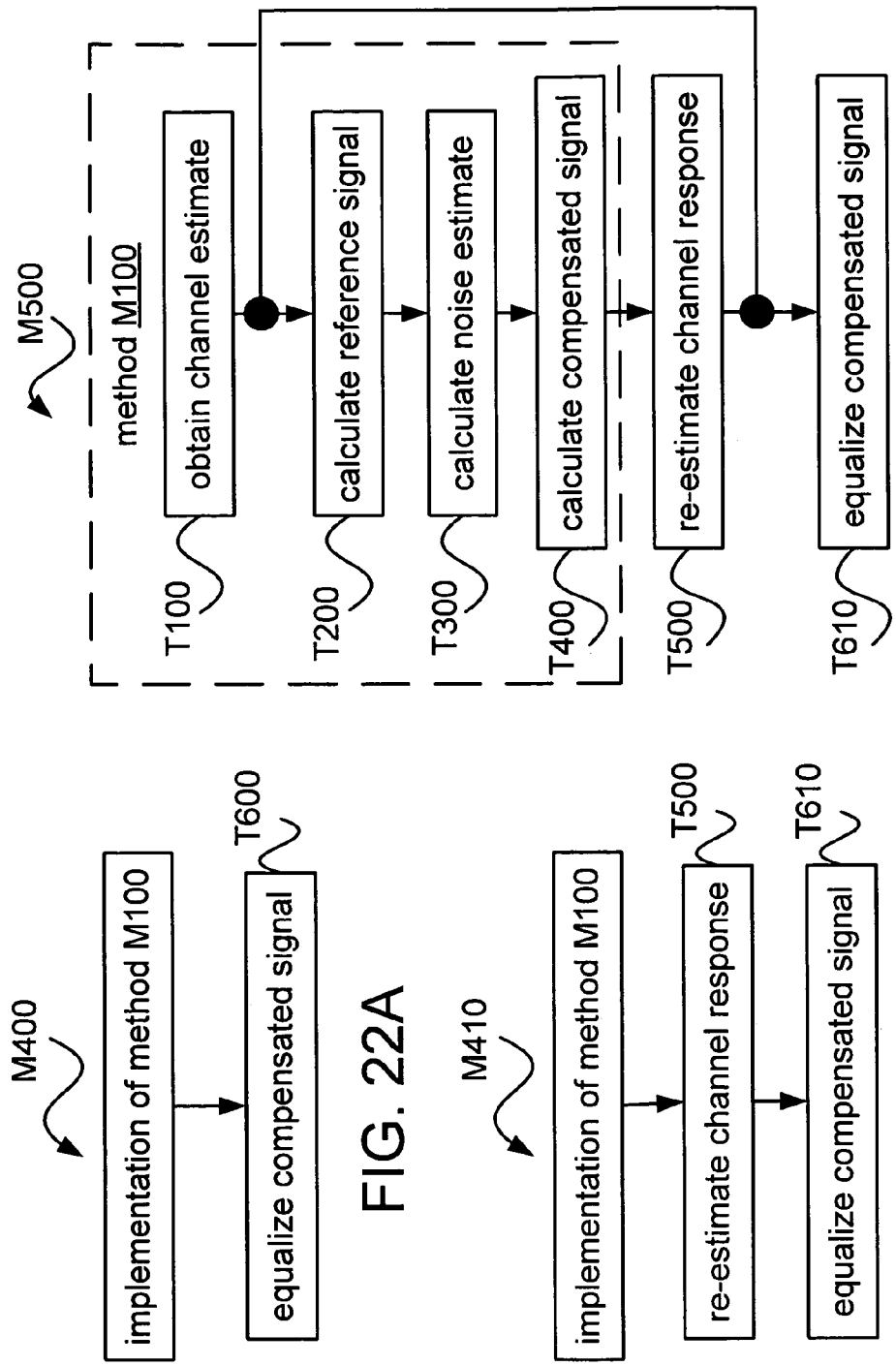

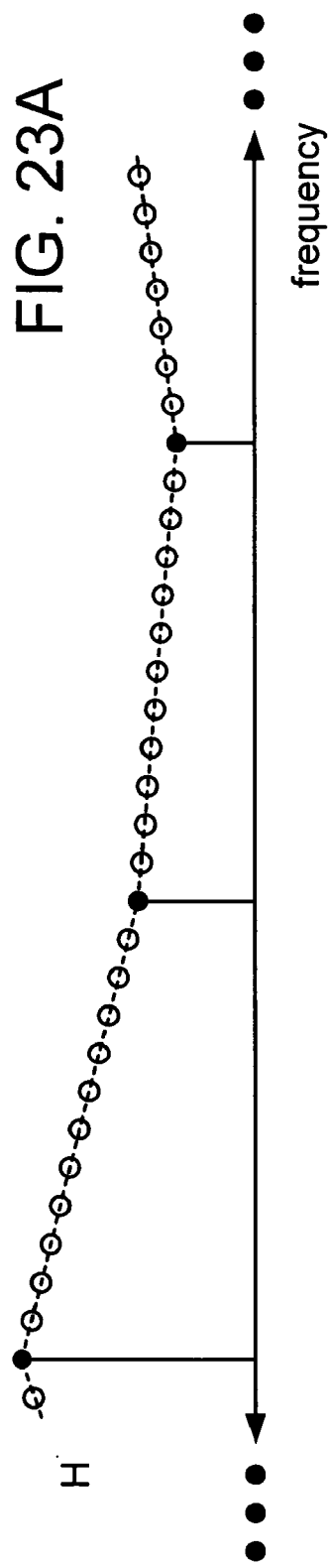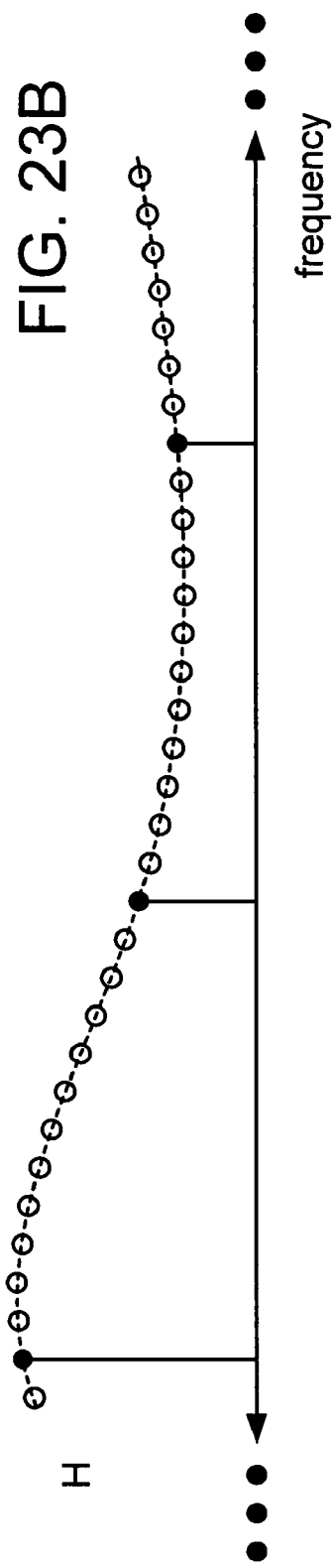

SYSTEMS, METHODS, AND APPARATUS FOR IMPULSE NOISE MITIGATION

RELATED APPLICATIONS

This application claims benefit of U.S. Provisional Patent Application No. 60/707,535, entitled "SYSTEMS, METHODS, AND APPARATUS FOR IMPULSE NOISE MITIGATION," filed Aug. 12, 2005. This application is also related to U.S. patent application Ser. No. 11/124,131, entitled "SYSTEMS, METHODS, AND APPARATUS FOR PHASE NOISE MITIGATION," filed May 9, 2005, and to U.S. patent application Ser. No. 11/261,614, entitled "SYSTEMS, METHODS, AND APPARATUS FOR MITIGATION OF NONLINEAR DISTORTION," filed Oct. 31, 2005.

FIELD OF THE INVENTION

This invention relates to wireless communications.

BACKGROUND

Multicarrier technology has been applied or tested in many different fields of communications, ranging from terrestrial uses to satellite communications, and from home networking to broadcast television transmission. Potential advantages of such technology include increased throughput and greater bandwidth utilization. One spectrally efficient form of multicarrier technology—orthogonal frequency division multiplexing (OFDM)—is already in common use in such varied applications as digital audio broadcasting (DAB), digital terrestrial television broadcasting (DVB-T or ISDB-T), digital television broadcasting for handheld devices (DVB-H), terrestrial and handheld digital multimedia broadcasting (DMB-T/H), digital subscriber line (DSL) for high-bit-rate digital subscriber services on twisted pair channels, and wireless networking under such standards as IEEE 802.11 and 802.16.

A multicarrier system design may be selected from among several different configurations. For example, a single-input, single-output (SISO) system transmits one multicarrier signal, while a multiple-input, multiple-output (MIMO) system transmits multiple multicarrier signals over the same band and includes antenna arrays at the transmitter and receiver. The modulation scheme to be applied may also be selected from among many different design options. Typically a phase-shift keying (PSK) scheme is used, such as quadrature PSK (QPSK), quadrature amplitude modulation (QAM), or offset QAM (OQAM). Typical QAM schemes include 4-, 16-, 64-, 256-, and 1024-QAM.

One example of an OFDM application, Terrestrial Digital Video Broadcast or "DVB-T," is specified in the European Telecommunications Standards Institute document EN 300 744. The DVB-T specification provides for a 2K mode (with 1705 subcarriers spaced about 4.5 kHz apart) and an 8K mode (with 6817 subcarriers spaced about 1.1 kHz apart), with the multicarrier signal being transmitted over a bandwidth of 5, 6, 7, or 8 MHz. The related handheld specification (DVB-H) also provides for a 4K mode (with 3409 subcarriers). Modulation schemes used in a DVB system may include QPSK, 16-QAM, and/or 64-QAM.

OFDM systems are generally more resistant to impulse noise than single-carrier systems. Such resistance is due to the longer duration of the OFDM symbol, as well as a distribution of impulse noise energy among the subcarriers. In general, robustness to impulse noise increases with the number of subcarriers. Also, smaller constellations and more powerful codes increase resistance to impulse noise.

Nevertheless, interference caused by the ignition system of a nearby vehicle; by switching of an electrical appliance such as a heater, refrigerator, fluorescent lamp, or dimmer; or by operation of an electrical appliance such as a hairdryer or vacuum cleaner, may cause interference sufficient to freeze a television picture received via an OFDM signal. Radiation from other electronic devices and/or from the receiver itself may also interfere with the reception of one or more carriers of the signal. It is desirable to mitigate interference from one or more such sources.

SUMMARY

A method of signal processing according to an embodiment includes estimating, based on a multicarrier signal received over a transmission channel, a response of the transmission channel, and estimating a plurality of data values carried by the received multicarrier signal. Estimating the plurality of data values includes calculating a reference signal, calculating a noise estimate, and compensating the portion of the received multicarrier signal carrying the plurality of data values. Calculating the reference signal is based on (A) the estimated response of the transmission channel and (B) a known pattern of data values carried by the received multicarrier signal. Calculating the noise estimate is based on a time-domain difference between the reference signal and a portion of the received multicarrier signal carrying the plurality of data values. Compensating the portion of the received multicarrier signal is performed in a frequency domain and according to the noise estimate.

A method of signal processing according to another embodiment includes estimating a symbol carried by a multicarrier signal received over a transmission channel, and calculating a model of the portion of the received multicarrier signal carrying the symbol. Calculating the model is based on the estimated symbol, a set of reference values, and an estimated response of the transmission channel. The method also includes identifying, in a time domain, corrupted values of the estimated symbol, and compensating, based on the locations of the corrupted values, the received multicarrier signal according to values of the calculated model.

A method of signal processing according to another embodiment includes estimating a response of a transmission channel and identifying at least one corrupted component of a multicarrier signal received over the transmission channel. The method also includes modifying, for each identified corrupted component, the estimated response of the transmission channel at a frequency corresponding to the corrupted component. The method also includes estimating a plurality of data values carried by the received multicarrier signal. Estimating the plurality of data values includes calculating a reference signal based on (A) the modified estimated response of the transmission channel and (B) a known pattern of data values carried by the received multicarrier signal. Estimating the plurality of data values also includes calculating, based on a difference between the reference signal and a portion of the received multicarrier signal carrying the known pattern, a noise estimate; and compensating, according to the noise estimate, the portion of the received multicarrier signal carrying the plurality of data values.

Further embodiments include methods according to any of the above in which the estimated response of the transmission channel includes an estimated response of the transmission channel at each of a plurality of different carrier frequencies of the received signal; in which a ratio between (A) the estimated response of the transmission channel at one of the plurality of carrier frequencies and (B) the estimated response of the transmission channel at another of the plurality of carrier frequencies varies over time; in which each of the plurality of data values is received on a different carrier of the signal; in which the method includes re-estimating, based on the compensated signal, the response of the transmission channel; and/or in which the method includes re-calculating, based on a re-estimated channel response, the noise estimate or model. Further embodiments include data storage media having machine-readable instructions describing one or more methods according to any of the above.

An apparatus according to an embodiment is configured to estimate a plurality of data values carried by a received multicarrier signal. The apparatus includes a reference signal generator configured to calculate a reference signal based on (A) an estimated response of the transmission channel and (B) a known pattern of data values carried by the received multicarrier signal. The apparatus also includes a noise estimator configured to calculate a noise estimate based on a time-domain difference between the reference signal and a portion of the received multicarrier signal carrying the plurality of data values. The apparatus also includes a signal compensator configured to compensate, in a frequency domain and according to the noise estimate, the portion of the received multicarrier signal carrying the plurality of data values. The reference signal generator includes a channel response estimator configured to calculate the estimated response of the transmission channel based on the received multicarrier signal.

An apparatus for signal processing according to another embodiment includes a symbol estimator configured to estimate a symbol carried by a multicarrier signal received over a transmission channel. The apparatus also includes a model calculator configured to calculate a model of the portion of the received multicarrier signal carrying the symbol. The model calculator is configured to calculate the model based on the estimated symbol, a set of reference values, and an estimated response of the transmission channel. The apparatus also includes a noise detector configured to identify, in a time domain, corrupted values of the estimated symbol; and a signal compensator configured to compensate the received multicarrier signal based on the locations of the corrupted values and according to values of the calculated model.

An apparatus according to a further embodiment is configured to estimate a plurality of data values carried by a multicarrier signal received over a transmission channel. The apparatus includes a reference signal generator configured to identify at least one corrupted component of the received multicarrier signal. The reference signal generator is also configured to modify, for each identified corrupted component, an estimated response of the transmission channel at a frequency corresponding to the corrupted component. The reference signal generator is also configured to calculate a reference signal based on (A) the modified estimated response of the transmission channel and (B) a known pattern of data values carried by the received multicarrier signal. The apparatus also includes a noise estimator configured to calculate a noise estimate based on a difference between the reference signal and a portion of the received multicarrier signal carrying the known pattern; and a signal compensator configured to compensate, according to the noise estimate, the portion of the received multicarrier signal carrying the plurality of data values.

BRIEF DESCRIPTION OF THE DRAWINGS

FIG. 6A shows a block diagram of an apparatus 100 according to an embodiment.

FIG. 6B shows a block diagram of an implementation 102 of apparatus 100.

FIG. 8A shows a plot of amplitude vs. frequency for pilot vector $\underline{X}_p$.

FIG. 8B shows a plot of amplitude vs. frequency for reference signal $\underline{Y}_R$.

FIG. 8C shows a plot of magnitude squared vs. time for non-deterministic component $\underline{y}_N$.

FIG. 15A shows a plot of magnitude squared vs. time for received signal portion $\underline{Y}_P$.

FIG. 15B shows a plot of amplitude vs. frequency for estimated channel response vector $\underline{H}_P$, and a linear interpolation operation.

FIG. 15C shows a plot of amplitude vs. frequency for estimated channel response vector $\underline{H}_P$, and a curve fitting operation.

FIG. 16A shows a flowchart for an implementation M320 of method M100.

FIG. 16B shows a flowchart for an implementation M330 of method M100.

FIG. 17A shows a plot of amplitude vs. frequency for noise estimate vector $\underline{I}_P$, and additional values of vector $\underline{I}$ as obtained from $\underline{I}_P$ by linear interpolation.

FIG. 17B shows a plot of amplitude vs. frequency for noise estimate vector $\underline{I}_P$, and additional values of vector $\underline{I}$ as obtained from $\underline{I}_P$ by a curve-fitting operation.

FIG. 21 shows a block diagram of an implementation 302 of apparatus 300.

FIG. 22A shows a flowchart of a method M400 according to an embodiment.

FIG. 22B shows a flowchart of an implementation M410 of method M400.

FIG. 22C shows a flowchart of a method M500 according to an embodiment.

FIG. 23A shows a plot of amplitude vs. frequency for estimated channel response vector $\underline{H}_P$, and additional values of vector $\underline{H}$ as obtained from $\underline{H}_P$ by linear interpolation.

FIG. 23B shows a plot of amplitude vs. frequency for estimated channel response vector $\underline{H}_P$, and additional values of vector $\underline{H}$ as obtained from $\underline{H}_P$ by a curve-fitting operation.

DETAILED DESCRIPTION

In the following description, the symbol j is used in two different ways. In some instances, the symbol j denotes the imaginary square root of −1 (as in $e^{j\Phi(t)}$). In other instances, the symbol j is used to indicate an index, such as a column of a matrix (as in $W_{ij}$). Both usages are common in the art, and one of skill will recognize which one of the two is intended from the context in which each instance of the symbol j appears.

In the following description, an underscore is used to indicate a vector (as in $\underline{h}$), and bold face is used to indicate a matrix (as in W). Vectors and matrices in the time domain are labeled in lower case (as in $\underline{h}$), and vectors and matrices in the frequency domain are labeled in upper case (as in W).

Unless expressly limited by its context, the term "obtaining" is used to indicate any of its ordinary meanings, including computing, calculating, measuring, estimating, receiving (e.g. from an external device), and retrieving (e.g. from a storage element). Unless expressly limited by their contexts, the term "calculating" includes, in addition to its ordinary meanings, selecting a value (e.g. from a list or table) according to a result of a computation or other calculation, and the term "calculated value" includes, in addition to its ordinary meanings, a value that is selected (e.g. from a list or table) according to a result of a computation or other calculation.

Figure 1:
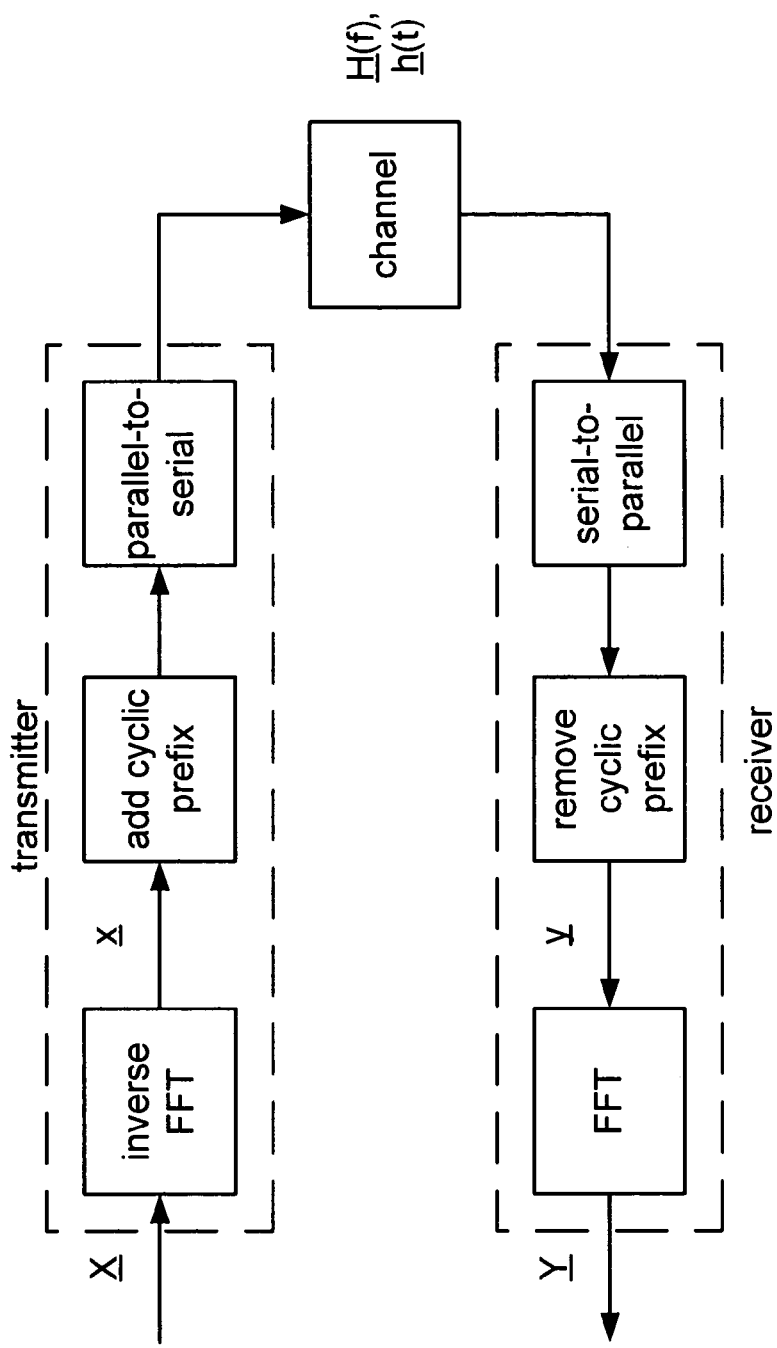
FIG. 1 is a block diagram showing an example of an OFDM system.

FIG. 1 shows a block diagram of a representative OFDM system. The transmitter receives a symbol X having M complex values, each representing a data value modulated onto a corresponding one of M subcarriers. The data values may be derived from one serial data stream, such as a television or other high-bandwidth signal. Alternatively, the data values may be derived from more than one (up to M) different data streams, as in a multiple-access system. In addition to data values corresponding to user traffic, the data values may also include one or more pilot signals whose values are a deterministic function of time and/or frequency (based on a known pseudorandom sequence, for example). The symbol X may also include null values interspersed among the data values and/or clustered apart from the data values (e.g. at values corresponding to carriers at the lowest and/or highest ends of the frequency range).

The subcarriers may be modulated according to a scheme such as m-ary PSK (e.g. QPSK) or m-ary QAM (e.g. 16-QAM or 64-QAM). The modulation scheme may vary from one subcarrier to another, as such variation may increase capacity or reduce bit-error rate under some constraints. Error detection, error correction, and/or redundancy coding operations, such as encoding, puncturing, and/or interleaving, may already have been performed on the data values prior to modulation.

Figure 2A:
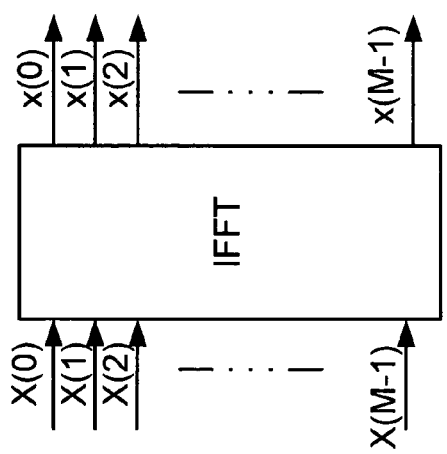
FIGS. 2A and 2B show inputs and outputs of an inverse FFT operation and an FFT operation, respectively.

As depicted in FIG. 2A, the transmitter applies an inverse fast Fourier transform or FFT (of at least M points) to the symbol X to obtain a corresponding complex time-domain sequence x. The transmitter may also insert a guard interval between symbols to reduce intersymbol interference. Typically, the transmitter inserts this interval by cyclic extension of the sequence x. For example, the transmitter may append a copy of the last N bits of the sequence x to the start of the sequence as a cyclic prefix, where the length N of the cyclic prefix is selected to be at least as large as the expected length L of the channel impulse response. A DVB transmitter may be configured to apply a guard interval of 1/32, 1/16, 1/8, or 1/4 of the length of the sequence. Either before or after the guard interval is inserted, the time-domain sequence is serialized for transmission. More than one such transmitter may be present in a MIMO system.

Figure 3:
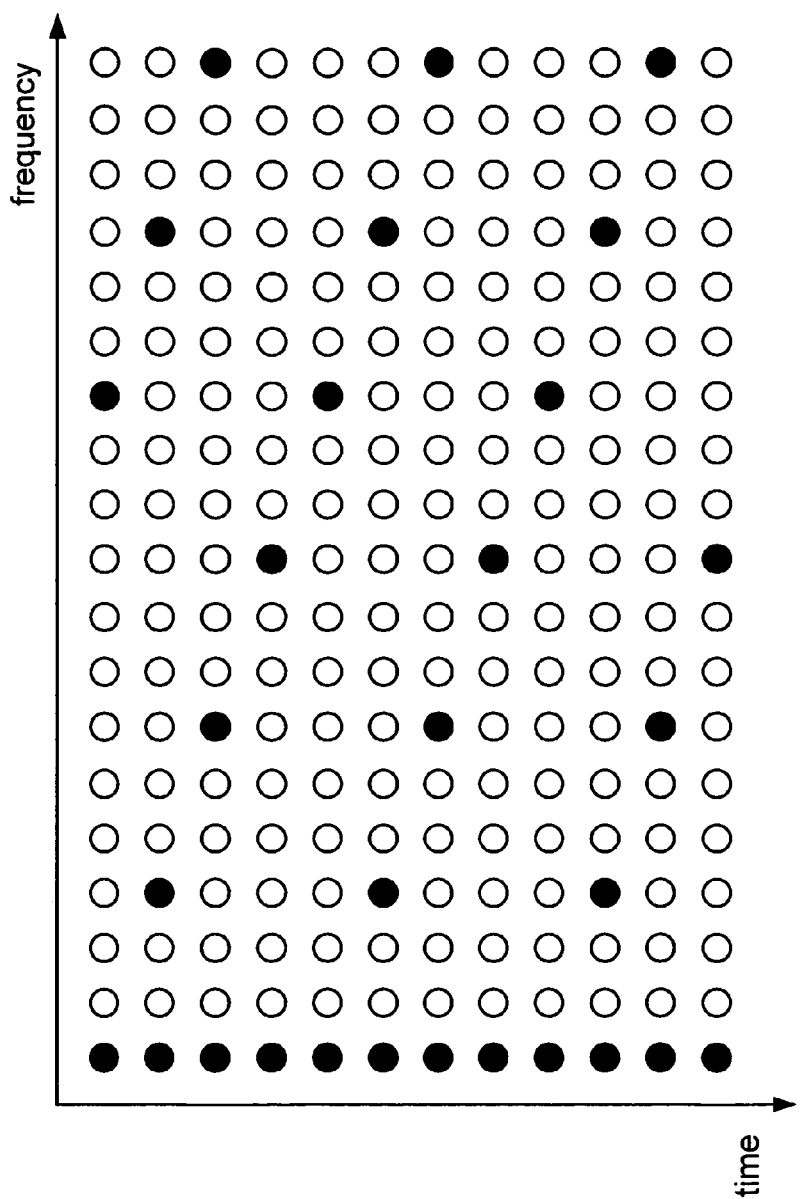
FIG. 3 is a diagram depicting a portion of a pilot scheme including a continuous pilot and scattered pilots.

Some of the M subcarriers may be reserved to carry a pilot signal. Typically the pilot signals form a pattern of data values that may be known a priori at the receiver. The pilot carrier assignments may be distributed across the frequency range, such that the channel response may be sampled across the bandwidth of the transmission. The carrier assignment scheme may be fixed or may vary over time. The DVB specifications provide for a scheme that includes continuous pilots, in which a carrier is modulated with a pilot signal during each symbol, and scattered pilots, in which a carrier is modulated with a pilot signal during some symbols and with a traffic signal during other symbols. FIG. 3 shows one example of such an assignment scheme, in which open circles represent traffic channels and filled circles represent pilot channels. In this example, the scattered pilots occur at intervals of twelve carriers in frequency and according to a pattern that is staggered by three carriers from one symbol to the next and has a period of four symbols in time.

Figure 2B:
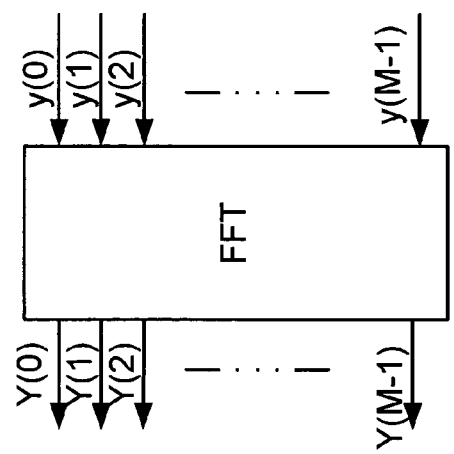

Effects of the transmission channel may include random noise (e.g. additive white Gaussian noise) and multipath fading. The channel effects are modeled as a function h of time and/or as a function H of frequency. At the receiver, the signal is parallelized and the cyclic extension is removed. The resulting time-domain signal $\underline{y}$ is converted (e.g. using an FFT) to the received frequency-domain symbol $\underline{Y}$, as depicted in FIG. 2B. The symbol $\underline{Y}$ is equalized to obtain an estimate of the transmitted symbol $\underline{X}$. Further processing may include demodulation and decoding.

As compared to a single-carrier system, a multicarrier system such as an OFDM system may exhibit reduced ISI and increased robustness to multipath effects. Orthogonality of consecutive symbols over time is maintained by inserting a guard interval such as a cyclic extension (e.g. prefix). OFDM systems also tend to have a relatively flat frequency response across each narrow subchannel.

It may be desirable to support reception of multicarrier or OFDM signals in mobile applications ranging from low-mobility portable devices to on-board vehicle equipment. For example, it may be desirable to support reception of DVB signals in a mobile environment. The channel response may be expected to vary over time in a mobile application, such that channel estimation becomes more important and also more difficult.

In the absence of impulse noise, a multicarrier signal as received over one symbol period may be modeled in the time domain as a function of the transmitted symbol, the channel response, and a random noise process:

$$y(k) = \sum_{l=0}^{L-1} h_l x(k-l) + n(k), 0 \leq k \leq M-1, \quad (1.1)$$

where y(k) denotes the signal as received at time i, h(l) denotes the channel impulse response at delay l, x(k) denotes the time-domain transmitted signal at time k, n(k) denotes a value of a random noise process at time k, M denotes the number of subbands, and L denotes the length of the channel impulse response. The random noise process $\underline{n}$ may be assumed to have Gaussian statistics with zero mean and variance $\sigma^2$.

In the frequency domain, the model of expression (1.1) may be expressed as $$\underline{Y} = H\underline{X} + \underline{N}, \quad (1.2)$$

where column vector $\underline{Y}$ denotes the frequency transform of $\underline{y}$; column vector $\underline{X}$ denotes the frequency transform of $\underline{x}$; column vector $\underline{N}$ denotes the frequency transform of $\underline{n}$; and H is a diagonal matrix whose diagonal is the vector $W_L \underline{h}$, where the (M×L) matrix $W_L$ is a frequency transform matrix. The frequency transform used will typically be the discrete Fourier transform (DFT), which may be implemented using any of the various fast Fourier transform (FFT) methods.

In one example, the matrix $W_L$ is the first L columns of the (M×M) DFT matrix W, whose elements are defined as $$W_{ij} = e^{-j2\pi \frac{ij}{M}},$$

where the indices i and j, $0 \leq ij \leq M-1$, denote row and column, respectively. The transform operation may include a scaling factor of $$\frac{1}{M}.$$

Alternatively, this factor may be applied in the inverse transform operation instead or may be split between the two operations (e.g. each of the transform and inverse transform operations being scaled by $$\frac{1}{\sqrt{M}}).$$

The vector $W_L \underline{h}$ may also be expressed as the M-element column vector $\underline{H}$. (As will be understood from the context, a notation $\underline{H}$ may also be used herein to denote a channel estimate vector having fewer than $\underline{M}$ elements.)

In the presence of impulse noise, a multicarrier signal as received over one symbol period may be modeled in the time domain according to the following expression:

$$y^{(0)}(k) = \sum_{l=0}^{L-1} h_l x(k-l) + i(k) + n(k), 0 \leq k \leq M-1, \quad (2.1)$$

where $y^{(0)}(k)$ denotes the signal as received at time k, and i(k) denotes the state of the impulse noise events at time k.

In the frequency domain, the model of expression (2.1) may be expressed as $$\underline{Y}^{(0)} = H\underline{X} + \underline{I} + \underline{N}, \quad (2.2)$$

where column vector $\underline{Y}^{(0)}$ denotes the frequency transform of $\underline{y}^{(0)}$; and column vector $\underline{I}$ denotes the frequency transform of $\underline{i}$.

Impulse noise events may be assumed to occur according to a Poisson distribution over time. It may be assumed that each impulse noise event has a short duration as compared to a symbol period, such that the energy of each event is distributed over some, many or even all of the carriers in the symbol. It may be desirable to mitigate effects of impulse noise in the received signal.

Figure 4B:
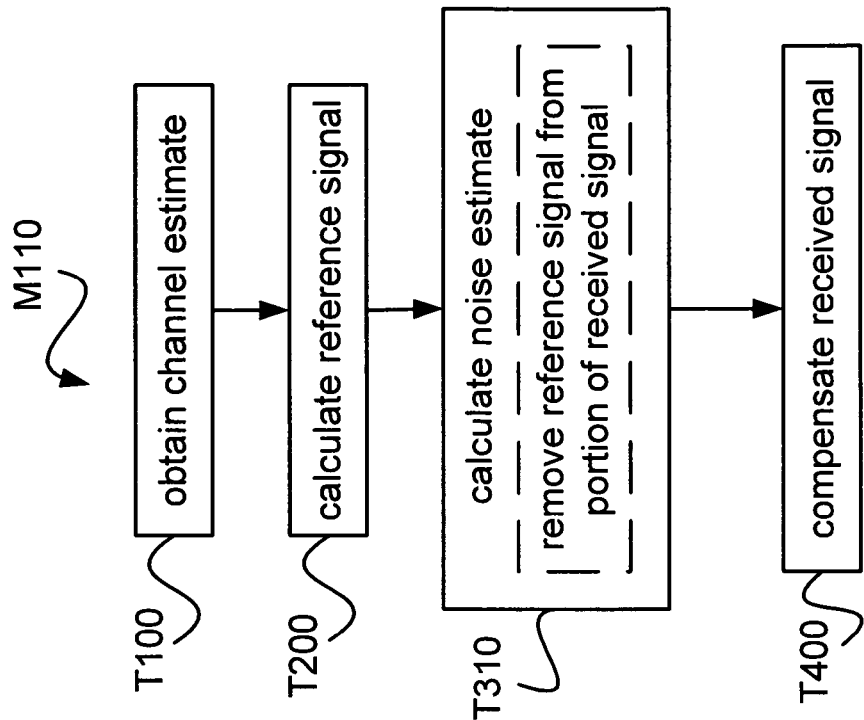
FIG. 4B shows a flowchart for an implementation M110 of method M100.
Figure 4A:
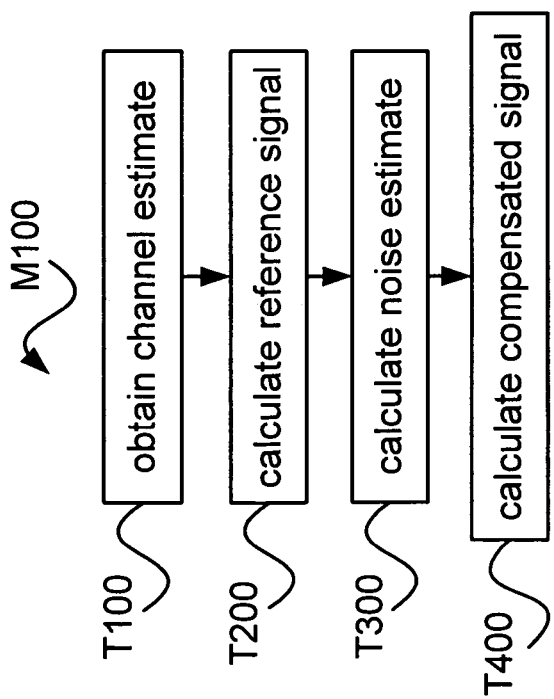
FIG. 4A shows a flowchart for a method M100 according to an embodiment.

FIG. 4A shows a flowchart for a method M100 according to an embodiment. Task T100 obtains an estimated response of the transmission channel. For an application in which known values (such as pilot signals) are transmitted over some set P of the subcarriers, knowledge of those components of $\underline{X}$ may be used to obtain an estimated channel response $\underline{H}_P^{(1)}$ over at least those subcarriers. Of the various parameters in the model of expression (2.1) or (2.2), the received signal is known, such that the estimated channel response may also be based on at least one received symbol. In one implementation, task T100 obtains an estimate $\underline{H}_P^{(1)}$ of the response of the transmission channel according to the expression $\underline{H}_P^{(1)} = \underline{Y}_P / \underline{X}_P$, where $\underline{X}_P$ is a column vector including those components of the transmitted symbol which are known. Other methods and structures for channel estimation are described herein, and task T100 may be implemented to perform any such method or to otherwise obtain (for example, from storage or from another device) an estimated channel response as calculated by any such method.

As noted above, pilot signals may be distributed across the range of subcarriers in time and/or frequency. In some applications, null carriers may be used with or instead of pilot signals. Although this description primarily uses the example of pilot signals in reference to known transmitted values, it should be understood that prior knowledge of transmitted values due to other data structures (such as packet headers) or time-based activities (such as synchronization sequences) may also be applied in estimating channel responses.

Task T200 calculates a reference signal. The reference signal may be based on a known portion of the data carried by the received signal, such as known components of the transmitted signal $\underline{X}$. The reference signal may also be calculated based on information derived from the received signal, such as an estimated channel response. In at least some implementations of task T200, the reference signal estimates a deterministic component of the received signal. For example, task T200 may estimate a known portion of the transmitted signal as received over the transmission channel.

Task T200 may be configured to calculate the reference signal based on the estimated channel response obtained in task T100. In one implementation, task T200 calculates the reference signal as a product of the estimated channel response and a known portion of the transmitted symbol, such as one or more pilot signals. For example, task T200 may be implemented to calculate the reference signal according to the frequency-domain expression $\underline{Y}_R^{(1)} = H_P^{(1)} \underline{X}_P$, where $H_P^{(1)} = \text{diag}(\underline{H}_P^{(1)})$. In another implementation, task T200 calculates the reference signal as a time-domain convolution according to the expression $\underline{y}_R^{(1)} = \underline{h}_P^{(1)} * \underline{x}_P$.

Task T300 calculates a noise estimate based on the reference signal. FIG. 4B shows a flowchart for an implementation M110 of method M100, which includes an implementation T310 of task T300. Noise estimate calculation task T310 performs a subtask that removes the reference signal from at least a portion of the received signal. Removing the reference signal may facilitate the detection and/or characterization of impulse noise in the remainder of the received signal.

Task T310 may be implemented to subtract the reference signal from at least a portion of the received signal. For example, task T310 may be implemented to subtract the reference signal from the received pilot signals. In at least some implementations, task T300 calculates an estimated non-deterministic component of the received signal based on a distance between an estimated deterministic component of the received signal (for example, the reference signal) and at least part of the signal as received.

Figures 5A, 5B:
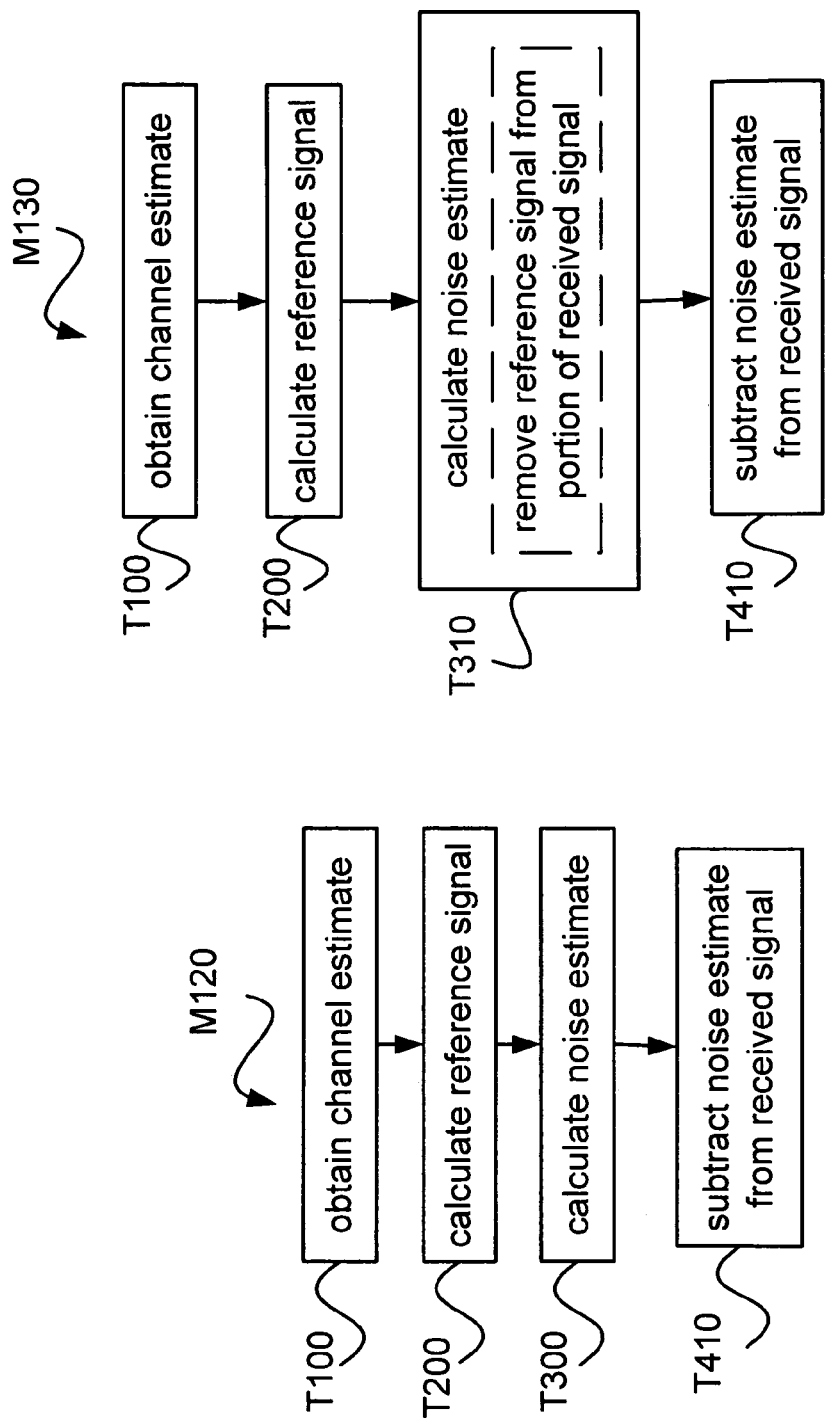
FIG. 5A shows a flowchart for an implementation M120 of method M100.
FIG. 5B shows a flowchart for an implementation M130 of method M110.

Task T400 calculates a compensated signal based on the received signal. For example, task T400 may be implemented to compensate the received signal (that is, to reduce an effect of noise in the received signal) according to the noise estimate. FIG. 5A shows a flowchart for an implementation M120 of method M100. Method M120 includes an implementation T410 of task T400 that compensates the received signal according to the noise estimate by subtracting the noise estimate from the received signal to obtain the compensated signal.

Task T410 may be implemented to calculate a compensated signal $\underline{Y}^{(1)}$ according to the frequency-domain expression $\underline{Y}^{(1)} = \underline{Y}^{(0)} - \underline{I}^{(1)}$. Task T410 may also be implemented to transform a time-domain impulse noise estimate $\underline{i}^{(1)}$ to the frequency domain before subtracting it from the received signal. FIG. 5B shows a flowchart for an implementation M130 of method M110 that includes task T310.

FIG. 6A shows a block diagram of an apparatus 100 according to an embodiment that is configured to receive an information signal S10 and to produce a corresponding compensated signal S40. Reference signal generator 110 is configured to calculate a reference signal S20. For example, reference signal generator may perform an implementation of task T200 as disclosed herein. Noise estimate calculator 120 is configured to calculate a noise estimate S30 based on the reference signal S20. For example, noise estimate calculator 120 may perform an implementation of task T300 as disclosed herein. Signal compensator 130 is configured to produce the compensated signal S40 based on received signal S10 and noise estimate S30. For example, signal compensator 130 may be configured to perform an implementation of task T400 as disclosed herein.

The various elements of apparatus 100 may be implemented as electronic and/or optical devices residing, for example, on the same chip or among two or more chips in a chipset, although other arrangements without such limitation are also contemplated. One or more elements of apparatus 100 may be implemented in whole or in part as one or more sets of instructions executing on one or more fixed or programmable arrays of logic elements (e.g. transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g. a processor used to execute portions of code corresponding to different elements at different times, or an arrangement of electronic and/or optical devices performing operations for different elements at different times).

FIG. 6B shows a block diagram of an implementation 102 of apparatus 100. In apparatus 102, signal compensator 130 is implemented as a combiner 132, such as an adder, that is configured to subtract the noise estimate S30 from the received signal S10.

Figures 7A, 7B:
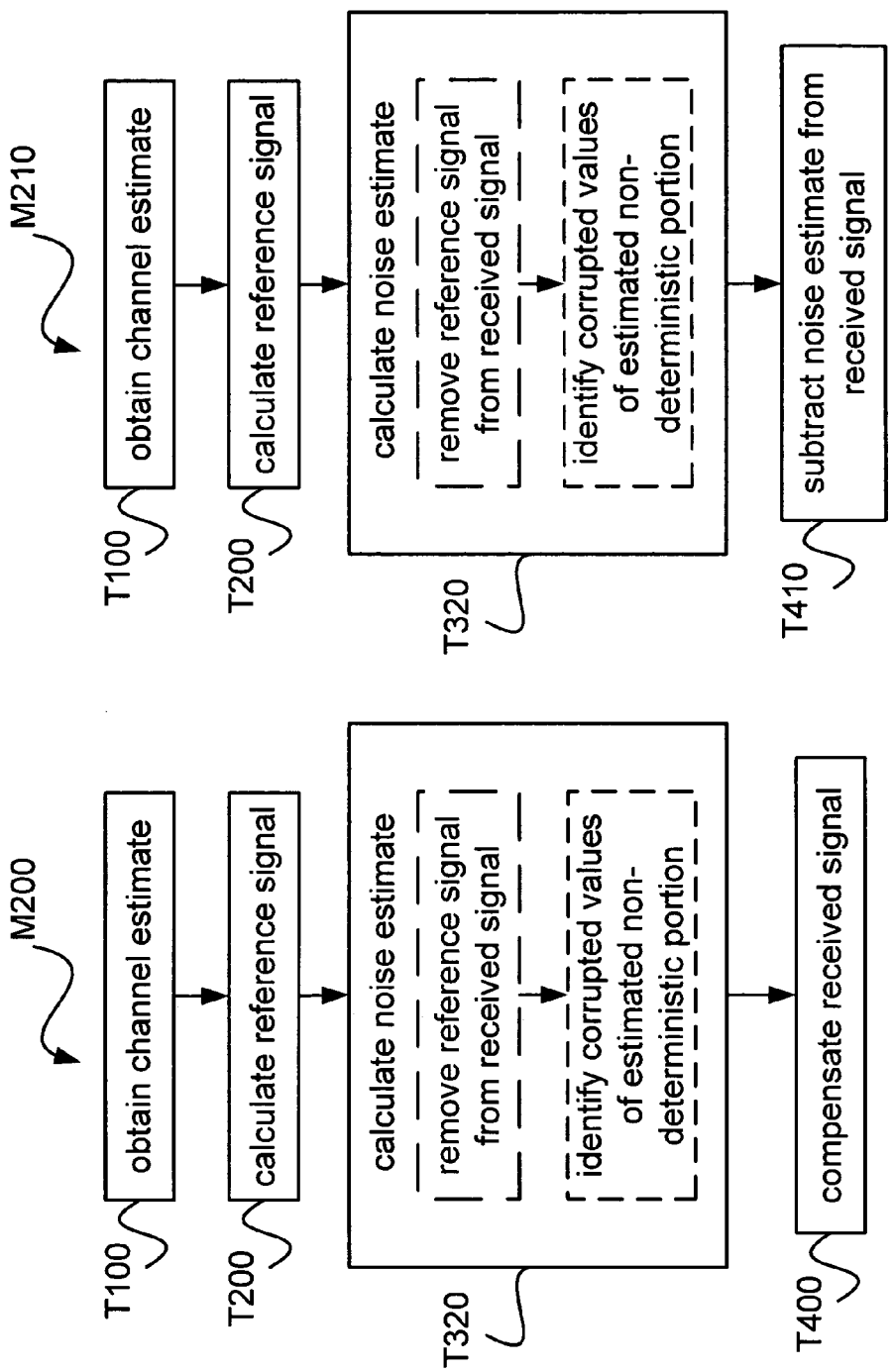
FIG. 7A shows a flowchart for an implementation M200 of method M100.
FIG. 7B shows a flowchart for an implementation M210 of method M200.

FIG. 7A shows a flowchart for an implementation M200 of method M110. Method M200 includes an implementation T320 of task T300 that calculates a noise estimate based on an estimated non-deterministic component of the received signal.

Task T320 includes a subtask that removes the reference signal from the received signal. For example, task T320 may be configured to calculate a difference between the received signal and the reference signal in the time domain. In one such implementation, task T320 subtracts the reference signal from the received signal according to the expression $\underline{y}_N^{(1)} = \underline{y}^{(0)} - \underline{y}_R^{(1)}$, where $\underline{y}_N^{(1)}$ represents an estimated non-deterministic component of the received signal. In such a case, task T320 may transform a frequency-domain reference signal $\underline{Y}_R^{(1)}$ to the time domain before subtracting it from the received signal $\underline{y}^{(0)}$.

Task T320 also includes a subtask that identifies one or more corrupted values of the estimated non-deterministic component. This subtask may include comparing values of the estimated non-deterministic component to a threshold value S60. A comparison to threshold S60 may be performed for each value of the estimated non-deterministic component. In one example, threshold S60 is compared to the power (e.g. the magnitude squared) of each time-domain sample of an estimated non-deterministic component $\underline{y}_N^{(1)}$. Values that are greater than threshold S60 (or, alternatively, not less than threshold S60) are identified as corrupted. In other examples, the comparison may be performed upon a measure of each time-domain value other than the power (such as a logarithm of the value).

Alternatively, threshold S60 may be compared to a measure relating to a set of values within a window, such as a sum of the squared magnitudes of the values in the window. The width of the window in time—which may be greater than, equal to, or less than the width of a symbol—may be selected according to an estimated duration of an impulse noise event. In one such example, the threshold S60 is compared to the average signal power of an estimated non-deterministic component over the width of the window. In another such example, the threshold S60 is compared to the total signal power of an estimated non-deterministic component over the width of the window. If the measure of the window is greater than threshold S60 (or, alternatively, not less than threshold S60), the values within the window are identified as corrupted. Alternatively, a value may be identified as corrupted if it falls within at least a certain number of windows identified as corrupted. Adjacent windows may be overlapping such that a value may fall within more than one window, or nonoverlapping such that each value is within only one window.

It may be desirable to obtain the value of threshold S60 according to one or more signal conditions. Threshold S60 may be derived from a measure of the power of received signal S10, or from a measure of the power of a portion of signal S10 (for example, received pilot signals). For example, threshold S60 may be based on an estimate $\hat{\sigma}_{h1}^2$ of the average channel power per sample, which may be calculated according to an expression such as the following:

$$\hat{\sigma}_{h1}^2 = \underset{p \in P}{\text{avg}}\{|H^{(1)}(p)|^2\}. \tag{3.1}$$

The average may be taken over all subcarriers of the symbol for which a value of $\underline{H}^{(1)}$ is available, or over a set P of the subcarriers of the symbol (for example, the set of pilot signals). The averaging in expression (3.1) may be calculated using a mean or a median. Alternatively, threshold S60 may be based on a measure of channel power calculated using another statistical filter.

Threshold S60 may include a weighting factor. In one example, threshold S60 has the value $w_1 \hat{\sigma}_{h1}^2$, where $w_1$ is a weighting factor that may be selected to balance desired detection rate against probability of false alarm for signals with high power. In one example, the value of $w_1$ is 25.

It may be desirable to vary the value of threshold S60 according to a selection from among a set of predetermined values. For example, the value of $w_1$ may be selected according to a match between a current signal characteristic and one of a set of models. Alternatively, threshold S60 or a factor thereof may be fixed at a value obtained, for example, according to a selection and/or calculation as described herein.

Task T320 may be configured to obtain the noise estimate $\underline{i}^{(1)}$ from values of the estimated non-deterministic component that are identified as corrupted. For each value of the component that is classified as noise, some or all of the value may be attributed to noise. If the classification of the sample as noise is correct, then it is usually better to attribute all of the sample power to noise, as the noise component of the corrupted sample is likely to be larger than the signal component. In this case, a blanking (or zeroing) nonlinearity may be used to calculate the noise estimate. In one example, the noise estimate $\underline{i}^{(1)}$ is computed in the time domain according to the following expression:

$$i^{(1)}(k) = \begin{cases} y_N^{(1)}(k), & |y_N^{(1)}(k)|^2 > S60 \\ 0, & \text{otherwise} \end{cases}. \tag{3.2}$$

If the classification of the sample as noise is wrong, however, attributing all of the sample power to noise may cause more signal distortion. In this case, a limiting (or clipping) nonlinearity may be used to calculate the noise estimate instead. For example, the signal may be clipped by attributing to noise only that portion of the sample power which exceeds threshold S60, according to an expression such as the following:

$$i^{(1)}(k) = \begin{cases} y_N^{(1)}(k) - S60, & |y_N^{(1)}(k)|^2 > S60 \\ 0, & \text{otherwise} \end{cases}. \tag{3.3}$$

FIG. 7B shows a flowchart for an implementation M210 of method M200. Method M210 includes an implementation T410 of task T400 that calculates a compensated signal according to the noise estimate by subtracting the noise estimate from the received signal.

FIG. 8A shows a plot of amplitude vs. frequency for a pilot signal vector $\underline{X}_P$ as may be applied in an instance of task T100. FIG. 8B shows a plot of amplitude vs. frequency for a corresponding reference signal $\underline{Y}_R^{(1)}$ as may be calculated by an instance of task T200. FIG. 8C shows a plot of magnitude squared vs. time for a non-deterministic component $\underline{y}_N^{(1)}$ as may be calculated in an instance of task T320. FIG. 8C also shows a threshold S60 being applied to component $\underline{y}_N^{(1)}$ to calculate a noise estimate $\underline{i}^{(1)}$. Although for ease of illustration FIGS. 8A and 8B show plots of real-valued vectors, in practice at least the vector $\underline{Y}_R^{(1)}$ would typically have complex values.

Figure 9:
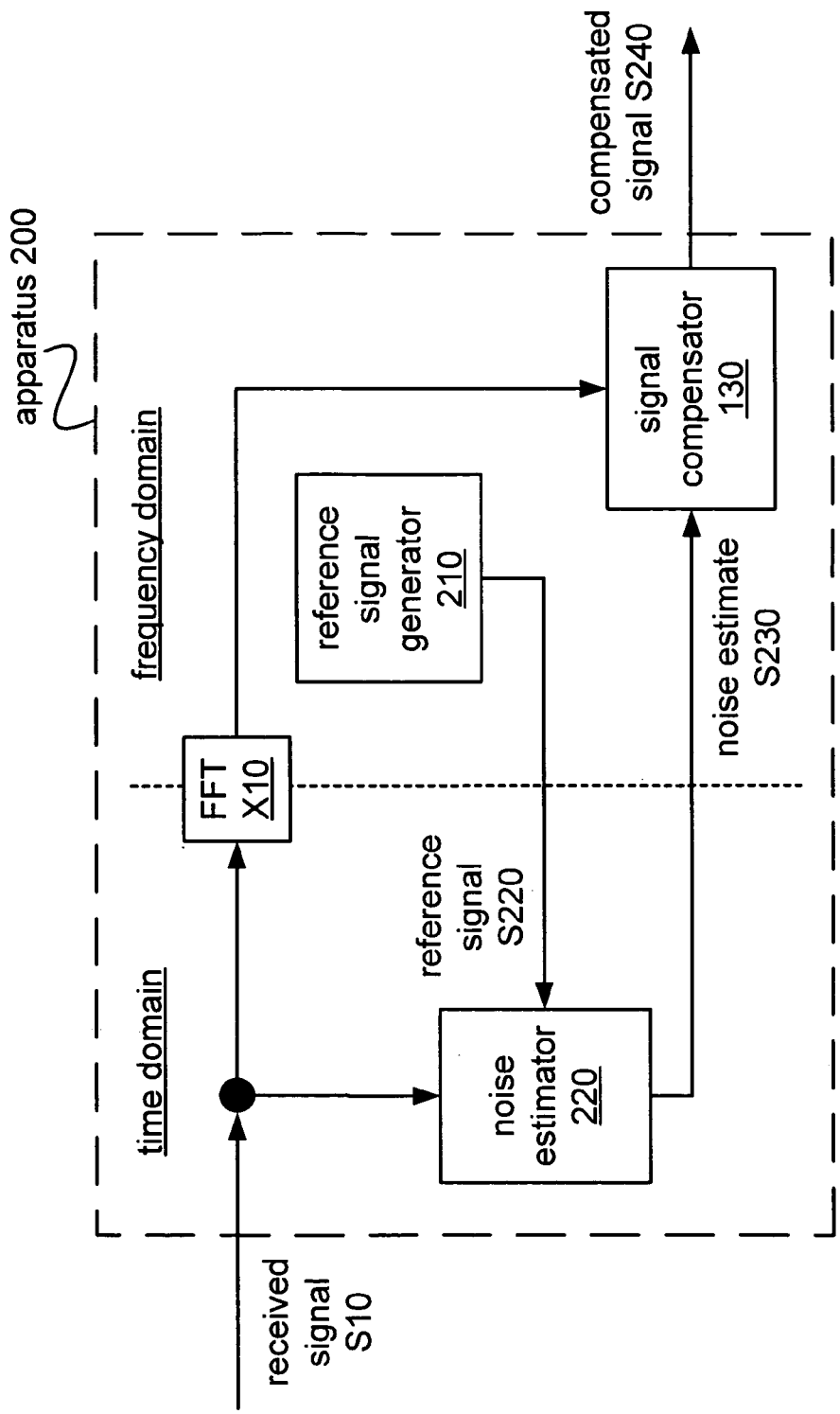
FIG. 9 shows a block diagram of an implementation 200 of apparatus 100.

FIG. 9 shows a block diagram of an implementation 200 of apparatus 100. Implementation 210 of reference signal generator 110 is configured to operate on values in a frequency domain, and implementation 220 of noise estimate calculator 120 is configured to operate on values in a time domain. The arrangement illustrated in FIG. 9 also includes a transform block X10 which may be configured as part of apparatus 102. Alternatively, transform block X10 may be configured as a separate element or process, such that a system including an instance of apparatus 100 may perform a frequency transform of information signal S10 even if the apparatus 100 is not activated. Transform block X10 may be configured to perform a discrete Fourier transform (for example, a fast Fourier transform), or other frequency transform appropriate for the application, according to any architecture or process known or to be developed.

Reference signal generator 210 is configured to calculate an instance S220 of reference signal S20 (based on a frequency transform of received signal S10, for example). Noise estimate calculator 220 is configured to calculate an instance S230 of noise estimate S30 based on reference signal S220 and received signal S10. Signal compensator 130 is configured to calculate an instance S240 of compensated signal S40 based on noise estimate S230 and a frequency transform of received signal S10.

Figure 10:
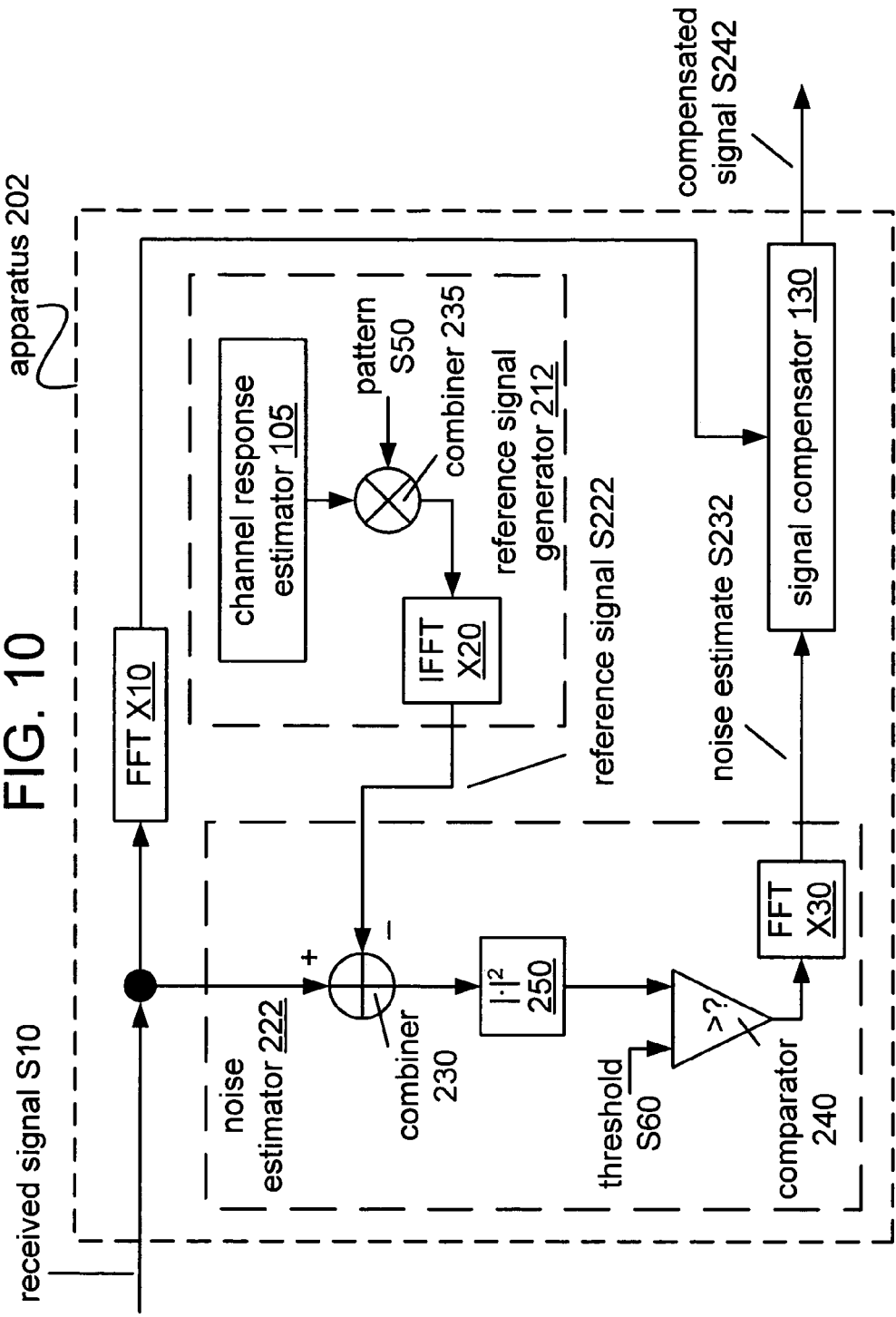
FIG. 10 shows a block diagram of an implementation 202 of apparatus 200.

FIG. 10 shows a block diagram of an implementation 202 of apparatus 200. Pattern S50 is a known portion of the transmitted signal, such as the pilot signal pattern $\underline{X}_P$. Reference signal generator 212 and noise estimate calculator 222 are implementations of reference signal generator 210 and noise estimate calculator 220, respectively.

Reference signal generator 212 includes a channel response estimator 105 that is configured to calculate an estimated response of the transmission channel (based on the received signal S10, for example). Combiner 235 is configured to produce an output that is based on both of its inputs. In this example, combiner 235 is configured to combine the estimated channel response with pattern S50 to obtain a reference signal in the frequency domain. Pattern S50 may be stored, generated, and/or received from another device. Combiner 235 may be implemented as a multiplier arranged to multiply the frequency-domain vectors $\underline{H}_P^{(1)}$ and $\underline{X}_P$ to obtain a reference signal $\underline{Y}_R^{(1)}$.

Inverse transform block X20 is configured to perform an inverse frequency transform on the reference signal in the frequency domain to obtain reference signal S222 in the time domain. Inverse transform block X20, which may be configured to perform an inverse discrete Fourier transform (for example, an inverse fast Fourier transform), may be constructed according to any architecture or process known or to be developed. Inverse transform block X20 may also be configured as a separate element or process, such that a system including an instance of apparatus 100 may perform an inverse frequency transform using block X20 even if the apparatus 100 is not activated. Reference signal S222 may estimate a deterministic component of the received signal.

In another implementation, reference signal generator 210 is configured to convolve an estimated channel response $\underline{h}_P^{(1)}$ and known pattern $\underline{x}_P$ to obtain a reference signal $\underline{y}_R^{(1)}$ in the time domain. In this case, reference signal generator 210 may include a combiner implemented as a convolver.

Noise estimator 222 includes a combiner 230 configured to subtract reference signal S222 from the received signal S10. Power calculator 250 is configured to calculate the magnitude squared of the combined signal. In another implementation, power calculator 250 may be configured to apply a window to the combined signal as described herein. Comparator 240 is configured to compare the power values to a threshold S60 to obtain a noise estimate in the time domain. For example, comparator 240 may be configured to perform an operation as described in expression (3.2) or (3.3).

Transform block X30 is configured to perform a frequency transform on the time-domain noise estimate to obtain noise estimate S232 in the frequency domain. Transform block X30, which may be configured to perform a discrete Fourier transform (for example, a fast Fourier transform), may be constructed according to any architecture or process known or to be developed. Transform blocks X10 and X30 may be implemented as the same structure or process operating on different signals at different times.

Signal compensator 130 is configured to produce compensated signal S242 as a difference between noise estimate S232 and received signal S10 in the frequency domain. In another implementation of apparatus 202, signal compensator 130 is configured to subtract the noise estimate from received signal S10 in the time domain.

As described above, for subcarriers of signal S10 whose transmitted signal is known, task T100 may be implemented to obtain an estimate of the channel response by dividing the received signal by the corresponding known transmitted signal:

$$H^{(0)}(p) = \frac{Y^{(0)}(p)}{X(p)}, \ p \in P. \tag{4.1}$$

Task T100 may also be configured to include an interpolation operation (in time and/or frequency) to obtain channel response estimates for subcarriers not in set P. Estimate $\underline{H}^{(0)}$ may be used as the estimated channel response $\underline{H}^{(1)}$, or a further operation may be performed to obtain $\underline{H}^{(1)}$ from $\underline{H}^{(0)}$. For example, it may be desirable to perform a filtering or curve-fitting operation on the estimated channel response, especially for an application in which the length of the channel response is much less than the number of subcarriers. Implementations of task T100 that obtain a filtered channel response estimate are described herein, and a estimated channel response may be obtained from previous received symbols by using, for example, a predictive process such as a least-mean-squares (LMS) algorithm.

Figure 11A:
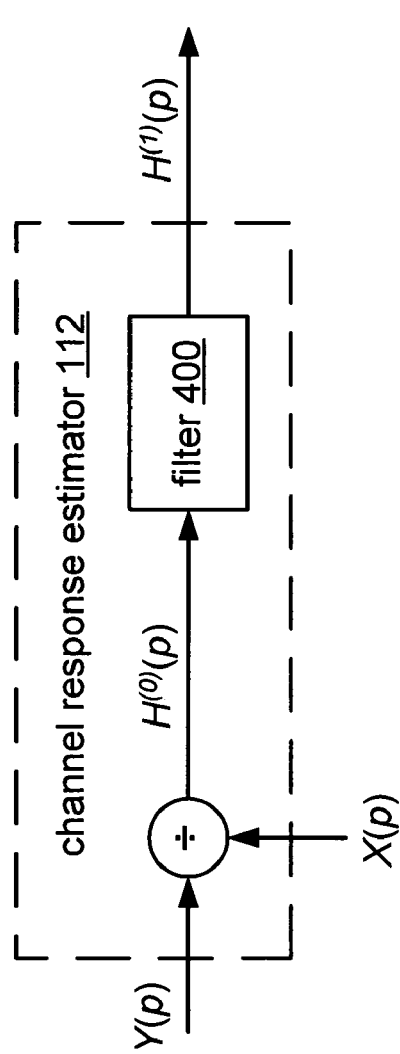
FIG. 11A shows a block diagram of an implementation 112 of channel response estimator 110.

Task T100 may be implemented to obtain a filtered channel response estimate $\underline{H}^{(1)}$ based on an initial estimate $\underline{H}^{(0)}$. FIG. 11A shows a block diagram of an implementation 112 of channel estimator 105 that may be used to perform such a task. Channel estimator 112 includes a filter 400 arranged to produce a filtered estimate $H^1(p)$ from estimate $H^0(p)$ for a carrier $p \in P$. Such an operation may be performed serially and/or in parallel to obtain filtered estimates for other elements of P.

An implementation T102 of task T100 recalculates the channel response estimate by transforming an initial channel response estimate into a different domain, truncating it according to an expected channel impulse response length, and performing an inverse transform on the truncated signal. Such filtering may be especially suitable for a channel whose response varies relatively quickly over time (e.g. from one symbol to the next). In one example, task T102 converts $\underline{H}^{(0)}$ to a time-domain sequence $\underline{h}^{(0)}$ by taking its inverse discrete Fourier transform:

$$\underline{h}^{(0)} = IDFT(\underline{H}^{(0)}) = W^H \underline{H}^{(0)}, \tag{4.2}$$

where the superscript H indicates the conjugate transpose operation.

Typically, only some of the M values of the transmitted symbol $\underline{X}$ are known a priori (for example, a set P of pilot signals). In such a case, the initial estimate vector $\underline{H}^{(0)}$ may only include elements that correspond to those values of $\underline{X}$, and the transform matrix W may be substituted by a reduced matrix $W_p$ that includes only the columns of W that correspond to those elements.

Applying the inverse transform to $\underline{H}^{(0)}$ produces an M-element vector $\underline{h}^{(0)}$. However, the channel impulse response may be known or assumed to have a length L that is less than M. Thus, it may be assumed that only the first L values of $\underline{h}^{(0)}$ are valid, and that the remaining values are noise. Task T102 truncates $\underline{h}^{(0)}$ (e.g. to length L) and applies a transform of the truncated vector $\underline{h}^1$ back into the domain of $\underline{H}^{(0)}$ to obtain the channel response estimate $\underline{H}^{(1)}$. In one example, the truncation of $\underline{h}^{(0)}$ is performed by applying a reduced transform matrix $W_L$ that includes only the first L columns of W:

$$\underline{H}^{(1)} = DFT(IDFT(\underline{H}^{(0)})) = W_L W^H \underline{H}^{(0)}. \tag{4.3}$$

A system or apparatus according to an embodiment may include an implementation of filter 400 configured to perform such an operation. One of skill in the art will understand that the transform matrix (e.g. $W_L W^H$) may be calculated and stored prior to run-time.

Figure 11B:
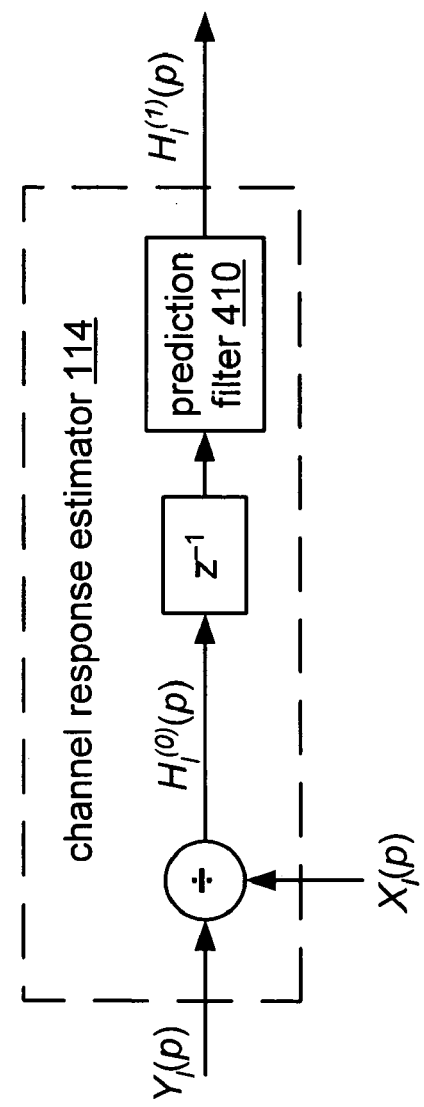
FIG. 11B shows a block diagram of an implementation 114 of channel response estimator 110.

Another implementation T104 of task T100 obtains a channel response estimate $\underline{H}^{(1)}$ based on information received during one or more previous symbol periods. Such filtering may be especially suitable for a channel whose response varies relatively slowly over time (e.g. less than the random noise process from one symbol to the next). FIG. 11B shows a block diagram of an implementation 114 of channel estimator 105. Estimator 114 includes a delay element and a prediction filter 410 that obtains a filtered estimate $H_l^{(1)}(p)$ of the channel response during symbol period l for a carrier $p \in P$, where $H_l^{(1)}(p)$ is based on one or more estimates $H^{(0)}(p)$ corresponding to symbol periods prior to l (and possibly on the current estimate $H_l^{(0)}(p)$).

Figure 12A:
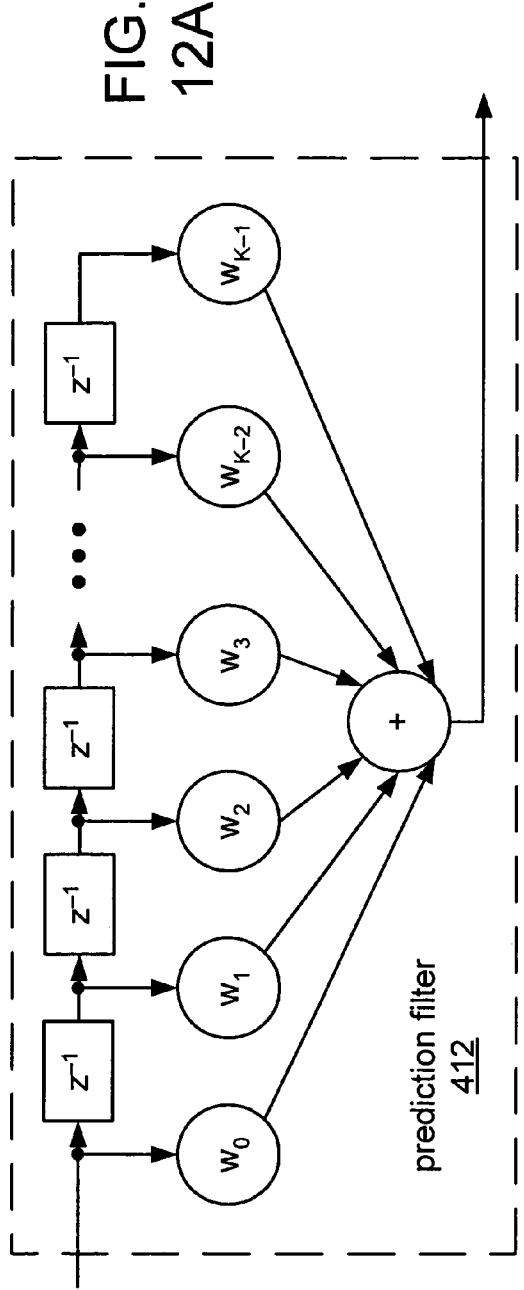
FIG. 12A shows a block diagram of an implementation 412 of prediction filter 410.

Task T104 may be configured to perform a linear prediction. For example, task T104 may obtain a channel estimate based on a sum of weighted values from signals received during previous symbol periods. In some instances (such as on a carrier that carries a continuous pilot), the weighted values may correspond to consecutive symbol periods. In other instances (such as on a carrier that carries a scattered pilot), the weighted values may correspond to symbol periods that are not consecutive (for example, every fourth symbol period). FIG. 12A shows an implementation 412 of prediction filter 410 that calculates a sum of K weighted values of signals received during previous symbol periods. The value of K may be fixed or may be selected based on an expected rate of change in the channel response over time. In one example, the value of K is six.

It may be desired for at least some of the filter weights to be adaptive (e.g. updated periodically and/or upon some event, as opposed to being fixed). For example, the value of a weight may be based on a characteristic of one or more current values of $H^{(0)}(p)$ or $H^{(1)}(p)$, one or more past values of $H^{(0)}(p)$ or $H^{(1)}(p)$, and/or a channel response estimate from another carrier. In some cases, the value of a weight may be based on an error signal, such as a difference between the current estimates $H_l^{(0)}(p)$ and $H_l^{(1)}(p)$.

Figure 12B:
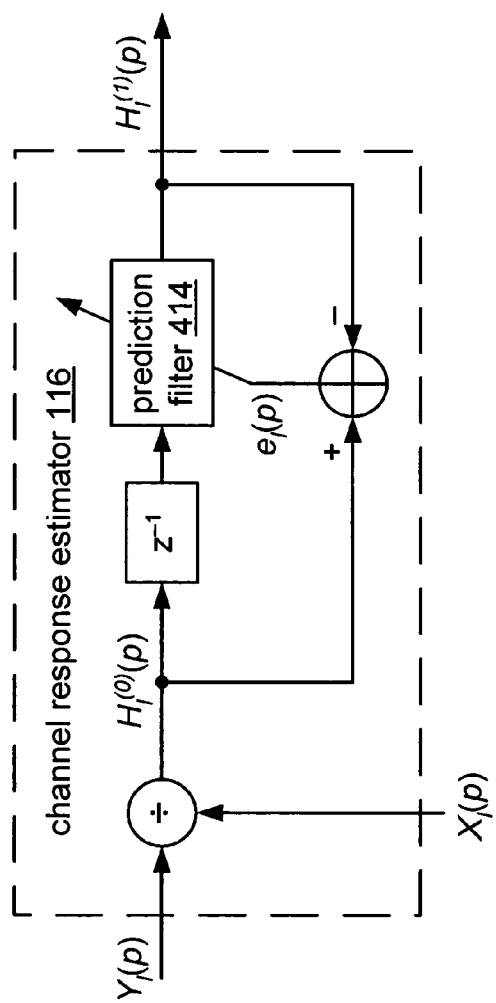
FIG. 12B shows a block diagram of an implementation 116 of channel response estimator 110.

Task T104 may be configured to update a set of filter weights according to an application of a least mean squares (LMS) or steepest-gradient algorithm, such as the following:

$$W_{l+r}(p) = W_l(p) + \mu e_l(p)[H_l^{(0)}(p)]^*, \tag{4.4}$$

where $W_l(p)$ denotes the vector of weight values $[W_0, W_1, \ldots, W_{M-1}]$ for symbol period l; $[H_l^{(0)}(p)]^*$ denotes the complex conjugate of the corresponding vector of input values to the weights; $e_l(p)$ denotes an error signal with value $)H_l^{(0)}(p)-H_l^{(1)}(p)$; $\mu$ denotes a step size parameter that may be fixed, selected, or adaptive; and r has value 1 for continuous pilot carriers and 4 for scattered pilot carriers. In another example, task T104 may be configured to apply a related method such as a normalized LMS or recursive LMS algorithm. FIG. 12B shows a block diagram of an implementation 116 of channel estimator 114 in which the values of one or more weights in an implementation 414 of prediction filter 412 may be updated based on such an algorithm.

Figure 13A:
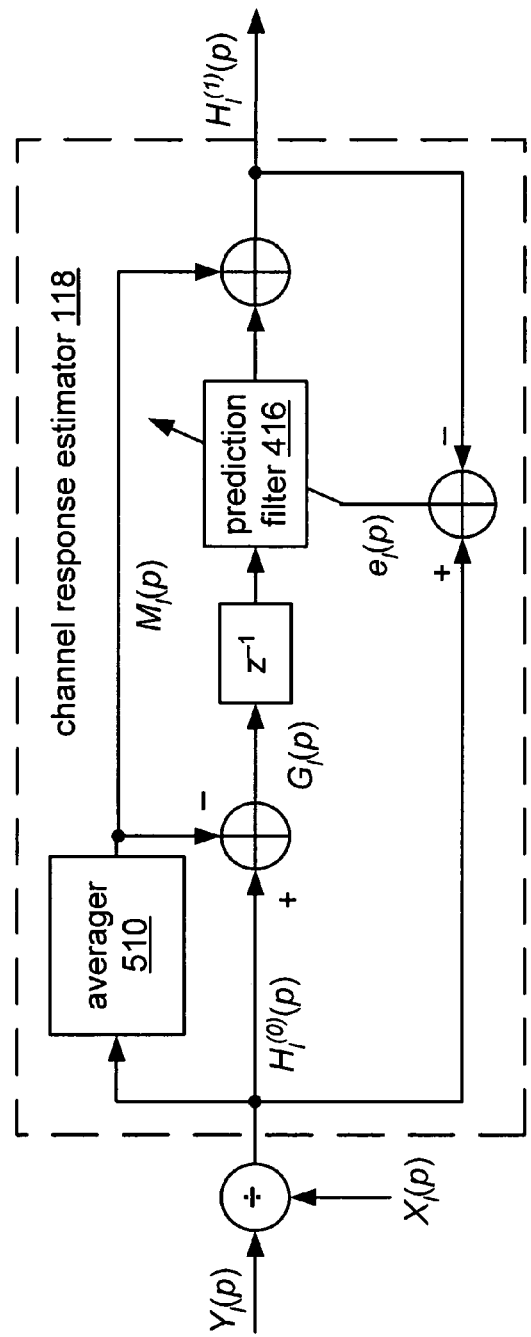
FIG. 13A shows a block diagram of an implementation 118 of channel response estimator 110.

It may be desirable to concentrate the prediction operation upon a portion of the channel response that changes over time. For example, it may be desirable to predict a distance of the current estimate from a mean estimate. FIG. 13A shows a block diagram of an implementation 118 of channel estimator 105 that includes an averager 510 and an implementation 416 of prediction filter 410. Averager 510 may be implemented as a moving averager having a finite impulse response (FIR) based on two or more noisy estimates. For a scattered pilot carrier, averager 510 may produce a mean value according to the following expression:

$$M_{l+r}(p) = \alpha H_l^{(0)}(p) + (1-\alpha) H_{l-r}^{(0)}(p), \tag{4.5}$$

where $\alpha$ is a weighting factor ($0 \leq \alpha \leq 1$) that may be fixed, selected, or adaptive. Alternatively, averager 510 may be implemented as a decaying integrator having an infinite impulse response (IIR) based on one or more previous states:

$$M_{l+r}(p) = \beta M_l(p) + (1-\beta) H_l^{(0)}(p), \tag{4.6}$$

where $\beta$ is a weighting factor ($0 \leq \beta \leq 1$) that may be fixed, selected, or adaptive. In one example, the factor $\beta$ has the value 63/64.

Filter 416 receives a value G that indicates a distance of the current noisy estimate from a mean estimate. In the example of FIG. 13A, the value of $G_l(p)$ is calculated as $H_l^{(0)}(p)-M_l(p)$. For a scattered pilot carrier, the values of the weights of filter 416 may be updated according to the following normalized LMS expression:

$$W_{l+r}(p) = W_l(p) + \frac{\mu e_l(p)[G_l(p)]^*}{|G_l(p)|^2}, \tag{4.7}$$

where $G_l(p)$ denotes the vector $[G_{l-r}, G_{l-2r}, \ldots, G_{l-Mr}]$ of input values to the weights for carrier p and symbol period l, and r has value 1 for continuous pilot carriers and 4 for scattered pilot carriers.

In some applications (for example, in a very noisy environment), it may be preferred to update the values of the weights based on information from other carriers (such as neighboring carriers). Averaging weight value corrections over a set of carriers (or all carriers) may provide a more robust channel response estimate. In one scattered pilot example, the correction values for the scattered pilot (SP) carriers in P are averaged, and the same weight values are used for all such carriers:

$$W_{l+1} = W_l + \mu \sum_{p \in SP(P)} \frac{e_l(p)[G_l(p)]^*}{|G_l(p)|^2}. \tag{4.8}$$

A similar operation may be applied to obtain a common weight value vector for the continuous pilot carriers in P. It should be noted that although the weights for the scattered pilots are updated every symbol period in this example, it may still be desirable to calculate a new filtered estimate for each such carrier only at every fourth symbol period, corresponding to the appearance of a new pilot signal on that carrier. One of skill in the art will understand that task T104 may also be implemented to obtain a channel response estimate $\underline{H}^{(1)}$ based on information received during one or more subsequent symbol periods (whether in addition to, or as an alternative to, the information received during the one or more previous symbol periods).

An implementation of task T100 as described herein may be applied to scattered pilot carriers to obtain channel response estimates for symbol periods during which pilot signals are transmitted. Such a task may also perform interpolation over time to obtain channel estimates for the carrier during symbol periods between the scattered pilot signals.

Figure 13B:
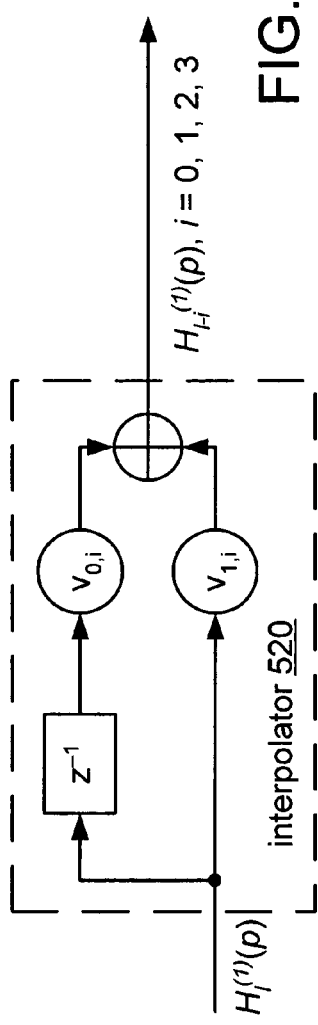
FIG. 13B shows a block diagram of interpolator 520.

FIG. 13B shows a block diagram of an interpolator 520 that calculates estimated channel responses for the three symbol periods preceding the period of the current estimate. In this example, the weights v for this linear interpolator are as follows:

$[v_{0,0}, v_{1,0}] = [0, 1];$ $[v_{0,1}, v_{1,1}] = [\frac{1}{4}, \frac{3}{4}];$ $[v_{0,2}, v_{1,2}] = [\frac{1}{2}, \frac{1}{2}];$ $[v_{0,3}, v_{1,3}] = [\frac{3}{4}, \frac{1}{4}].$ Other implementations of interpolator 520 may apply a non-linear function (for example, a higher-order polynomial such as quadratic or cubic, or some other function or statistic) and/or perform an interpolation based on more than two estimates.

An implementation of task T100 may further perform an interpolation along the frequency axis to obtain channel estimates for the data carriers. Possible forms of such interpolation range from linear interpolation between the two closest pilot channel estimates to an FIR or IIR interpolation based on more (possibly all) of the available channel estimates for the symbol period. Interpolation of channel response estimates for intermediate pilot and/or data carriers may also be implemented as a two-dimensional (e.g. surface-fitting) operation in time and frequency.

Calculating an estimate for the impulse noise in the time domain may be computationally intensive. For example, a time-domain method may involve one or more additional transform operations for each received symbol. While such complexity may be acceptable in a 64-carrier system (for example, for a wireless LAN), the cost of the additional chip area to support such operations may be prohibitive for systems having thousands of carriers (e.g. DVB-T/H). In some implementations, however, it may be possible to configure a time-domain method as described herein to re-use results of one or more transform (and/or inverse transform) operations that are performed during other procedures on the received signal, such as a procedure to estimate the channel response, to compensate other types of noise, or to map the received signal to a set of constellation points. Likewise, it may be possible to configure an apparatus to perform such a method within a system that includes structures and/or processes that may be arranged to perform such tasks on different signals at different times.

It may be desirable to mitigate effects of frequency-domain impulse noise (or "narrowband interference") in the received signal. The energy of such a noise event is typically distributed over a narrower bandwidth than a time-domain impulse noise event, and the noise event may irretrievably corrupt one or more carriers over one or more symbols.

Narrowband interference may occur when the spectrum of another communications transmission overlaps the spectrum of the desired transmission. In some digital television systems, for example, analog television signals are broadcast within the same spectrum, such that carriers for analog luma and/or chroma television signals (and/or harmonics of such signals) may represent narrowband co-channel interference to a digital television receiver.

Figures 14A, 14B:
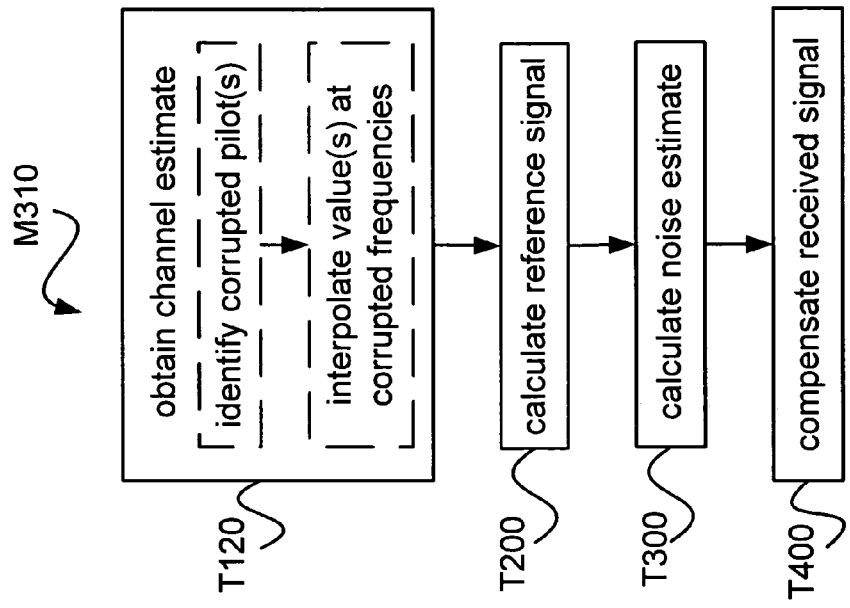
FIG. 14A shows a flowchart for an implementation M300 of method M100.
FIG. 14B shows a flowchart for an implementation M310 of method M300.

FIG. 14A shows a flowchart for an implementation M300 of method M100. Method M300 includes an implementation T110 of task T100 that obtains an estimated channel response. Task T110 includes a subtask that identifies corrupted carriers of a received signal (for example, carriers that are corrupted by narrowband interference). In some implementations, task T110 applies a threshold to received signal S10 to identify corrupted carriers in the received symbol. For example, task T110 may compare a measure of each pilot signal of S10 to a threshold value. Task T110 also modifies an initial estimated channel response $\underline{H}^{(0)}$ according to the identified carriers to produce a modified estimate $\underline{H}^{(1)}$.

Task T110 may be configured to obtain an initial estimate $\underline{H}^{(0)}$ of the channel response by dividing the received signal S10 by the corresponding known transmitted signal, according to expression (4.1), for example. Such an estimate may be sufficiently accurate, at least for a first iteration, although any method or methods of channel response estimation as disclosed herein may be used in a first or subsequent iteration. For example, task T110 may be configured to obtain the initial estimate using additional processing, such as IFFT filtering or curve fitting, or a predictive process based on previous symbols, such as a least-mean-squares process.

Task T110 may be configured to identify corrupted pilot signals by comparing the power (e.g. the magnitude squared) of each pilot value of received signal S10 to a threshold S70, such that carriers having power values greater than the threshold S70 (or, alternatively, not less than threshold S70) are identified as corrupted. Alternatively, threshold S70 may be compared to a measure relating to a set of values within a window, such as a sum of the squared magnitudes of the values in the window. The width of the window in frequency may be selected according to an estimated bandwidth of an impulse noise event. In one such example, threshold S70 is compared to the average pilot signal power of received signal S10 over the width of the window. In another such example, threshold S70 is compared to the total pilot signal power of received signal S10 over the width of the window. If the measure of the window is greater than threshold S70 (or, alternatively, not less than threshold S70), the values within the window are identified as corrupted. Alternatively, a value may be identified as corrupted if it falls within at least a certain number of windows identified as corrupted. Adjacent windows may overlap in frequency such that a value may fall within more than one window, or may be nonoverlapping such that each value is within only one window.

It may be desirable to obtain the value of threshold S70 according to one or more signal conditions. Threshold S70 may be derived from a measure of the power of received signal S10, or from a measure of the power of a portion of signal S10 (for example, received pilot signals). For example, threshold S70 may be based on an estimate $\hat{\sigma}_{h0}^2$ of the average channel power per sample, which may be calculated according to an expression such as the following:

$$\hat{\sigma}_{h0}^2 = \underset{p \in P}{\text{avg}}\{|H^{(0)}(p)|^2\}. \quad (5.1)$$

The average may be taken over all subcarriers of the symbol for which a value of $\underline{H}^{(0)}$ is available, or over a set P of the subcarriers of the symbol (for example, the set of pilot signals). The averaging in expression (5.1) may be calculated using a mean or a median. Alternatively, threshold S70 may be based on a measure of channel power calculated using another statistical filter.

Threshold S70 may include a weighting factor. In one example, threshold S70 has the value $w_2 \hat{\sigma}_{h0}^2$, where $w_2$ is a weighting factor that may be selected to balance desired detection rate against probability of false alarm for signals with high power. In one example, the value of $w_2$ is nine.

It may be desirable to vary the value of threshold S70 according to a selection from among a set of predetermined values. For example, the value of $w_2$ may be selected according to a match between a current signal characteristic and one of a set of models. Alternatively, threshold S70 or a factor thereof may be fixed at a value obtained, for example, according to a selection and/or calculation as described herein.

FIG. 14B shows a flowchart for an implementation M310 of method M300. Method M310 includes an implementation T120 of task T100 that obtains a modified estimated channel response $\underline{H}^{(1)}$ based on an initial channel response estimate $\underline{H}^{(0)}$. Task T120 includes a subtask that obtains a new channel response value for a corrupted frequency, based on one or more values of initial estimate $\underline{H}^{(0)}$. Task T120 may be configured to obtain a new channel response value for each of the carriers that are identified as corrupted.

Task T120 may be implemented to derive the new value from values of $\underline{H}^{(0)}$ that correspond to carriers adjacent to the corrupted frequency (for example, values of $\underline{H}_P^{(0)}$ that correspond to carriers adjacent in set P to the corrupted frequencies). For example, task T120 may be implemented to perform a linear (or higher-order) interpolation based on one or more values of $\underline{H}^{(0)}$ on either side of the corrupted carrier. Depending on the form of estimated response $\underline{H}^{(0)}$, the new value may be derived from estimated channel response values at pilot and/or traffic frequencies. Task T120 may also be implemented to interpolate across a gap including more than one corrupted carrier.

FIG. 15A shows a plot of magnitude squared vs. frequency for received signal $\underline{Y}_P^{(0)}$. FIG. 15A also shows comparison of a threshold S70 to power values of $\underline{Y}_P^{(0)}$ according to an implementation of task T110. Although for ease of illustration only one corrupted carrier c is shown, task T110 may identify more than one corrupted carrier in a symbol of signal $\underline{Y}_P^{(0)}$. For example, task T110 may identify two or more adjacent carriers of signal $\underline{Y}_P^{(0)}$ as corrupted.

FIGS. 15B and 15C show plots of amplitude vs. frequency for an estimated channel response vector $\underline{H}_P$, where the filled circles indicate values of initial estimated response vector $\underline{H}_P^{(0)}$. FIG. 15B shows a linear interpolation operation to obtain a new value at corrupted carrier c for modified estimated response vector $\underline{H}_P^{(1)}$ (open circle), as according to an implementation of task T120. At other (e.g. noncorrupted) carriers, the values of $\underline{H}_P^{(0)}$ and $\underline{H}_P^{(1)}$ may be the same.

FIG. 15C shows a curve-fitting operation (e.g. a higher-order interpolation operation) to obtain a new value at corrupted carrier c for modified estimated response vector $\underline{H}_P^{(1)}$ (open circle), as according to another implementation of task T120. Although FIGS. 15B and 15C show interpolation of a modified value for a single corrupted carrier c, it may be desirable in some cases for task T120 to interpolate across a gap of two or more corrupted carriers. Although for ease of illustration FIGS. 15B and 15C show plots of real-valued vectors, in practice an estimated channel response vector $\underline{H}$ would typically have complex values. One of skill in the art will appreciate that the response of the transmission channel at different frequencies may vary differently from one symbol to another, such that the ratio between the responses of the channel at two different frequencies in set P will typically vary over time.

FIG. 16A shows a flowchart for an implementation M320 of method M100. Method M320 includes an implementation T360 of noise estimate calculation task T300. Task T360 includes a subtask that calculates noise estimate values for a set P of carriers for which the corresponding transmitted values are known and derives, from those values, noise estimate values for other carriers in the symbol. For example, task T360 may be implemented to interpolate noise estimate values for traffic carriers in noise estimate $\underline{I}^{(1)}$ that are based on noise estimate values $\underline{I}_P^{(1)}$ calculated for a set of pilot carriers.

FIGS. 17A and 17B show plots of amplitude vs. frequency for two versions of a noise estimate vector $\underline{I}^{(1)}$, where the filled circles indicate values that are also in vector $\underline{I}_P^{(1)}$. FIG. 17A shows results of a linear interpolation operation to obtain values of $\underline{I}^{(1)}$ at frequencies not represented in $\underline{I}_P^{(1)}$ (open circles), as according to an implementation of task T360. FIG. 17B shows a curve-fitting operation (e.g. a higher-order interpolation operation) to obtain values of $\underline{I}^{(1)}$ at frequencies not represented in $\underline{I}_P^{(1)}$ (open circles), as according to another implementation of task T360. In such case, values for carriers between zero values of $\underline{I}_P^{(1)}$ may be interpolated according to the fitted curve or, as shown in FIG. 17B, it may be desired to assume zero values for carriers between zero values of $\underline{I}_P^{(1)}$. Task T360 may also include an operation of filtering or smoothing the interpolated noise estimate.

FIG. 16B shows a flowchart for an implementation M330 of method M320. Method M330 includes an implementation T370 of noise estimate calculation task T360. Task T370 includes a subtask that calculates values of a noise estimate vector $\underline{I}_P^{(1)}$ by subtracting the reference signal from a portion of the received symbol, such as a set P of carriers for which the corresponding transmitted values are known. For example, task T370 may be implemented to subtract the reference signal from the received pilot signals in the frequency domain according to an expression such as $\underline{I}_P^{(1)} = \underline{Y}_P^{(0)} - \underline{Y}_R^{(1)}$.

Figure 18:
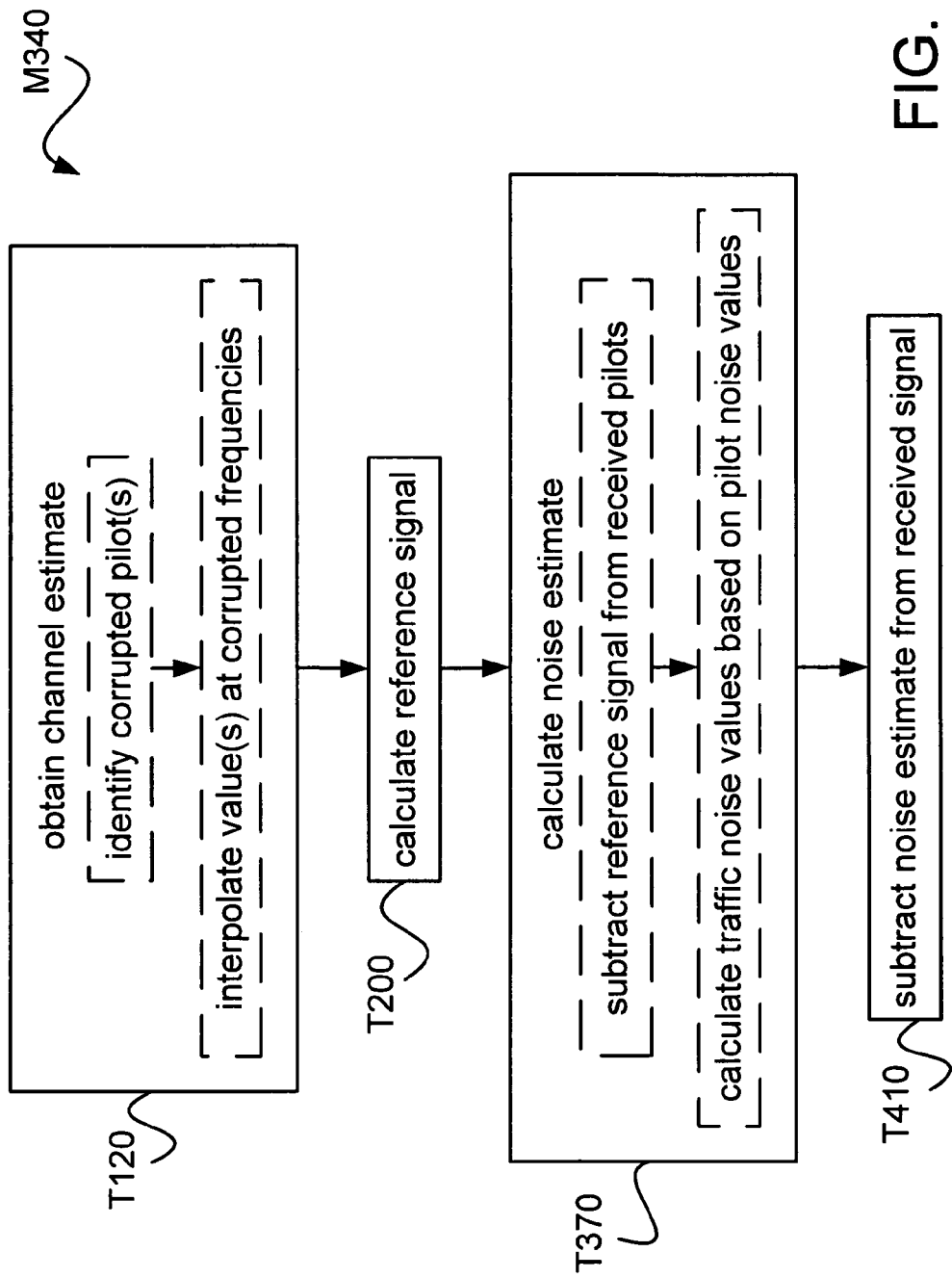
FIG. 18 shows a flowchart of an implementation M340 of method M310.
Figure 19:
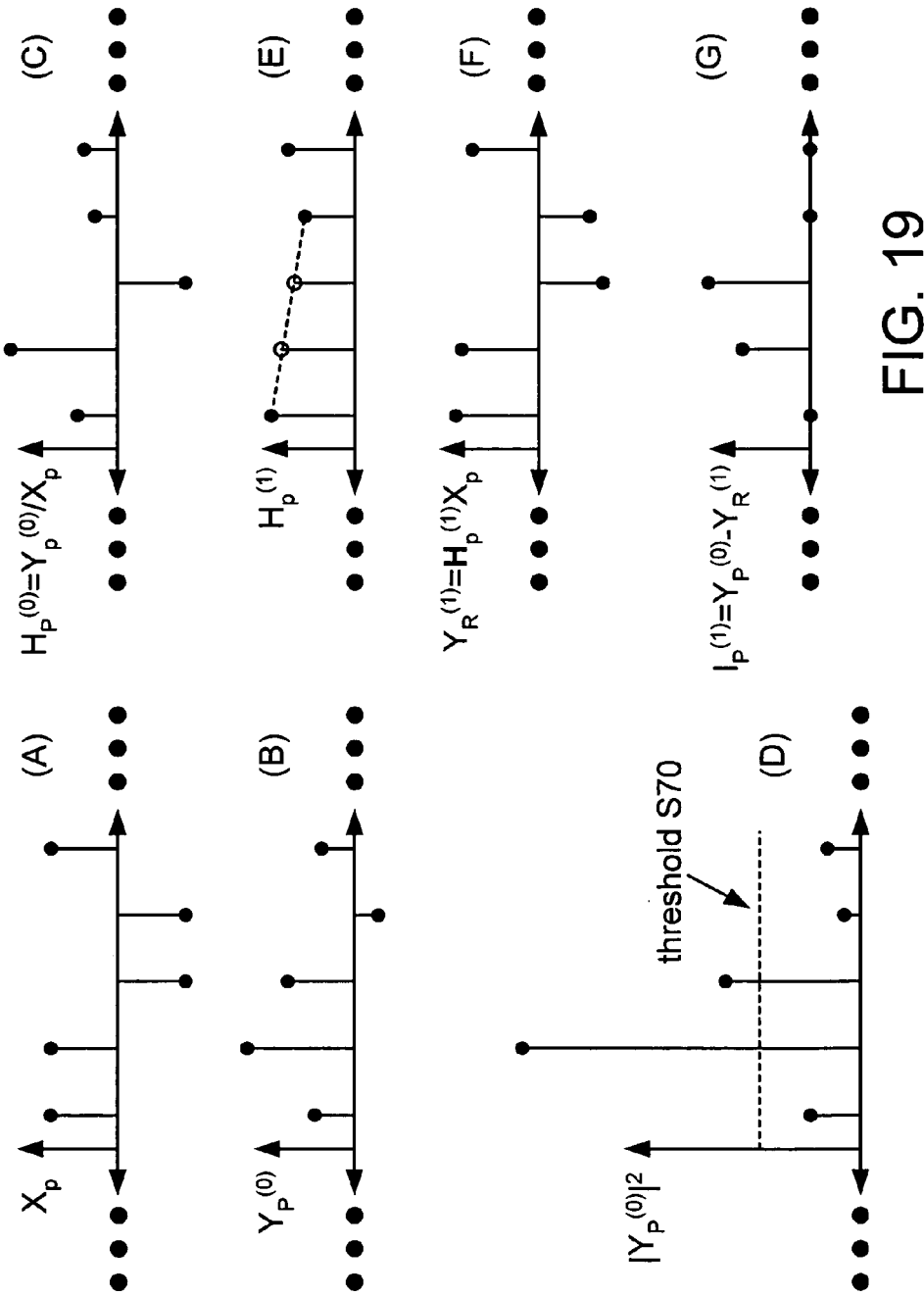
FIG. 19 shows a series of plots that illustrate stages in an example of method M340.

FIG. 18 shows a flowchart of an implementation M340 of method M310 that includes tasks T120, T370, and T410. FIG. 19 shows a series of plots that illustrate stages in an example of such a method. In all of the plots of FIG. 19, the horizontal axis indicates the same portion of the symbol bandwidth, although the vertical axes of the various plots may not all be of the same scale.

Plot (A) of FIG. 19 shows a portion of the known transmitted vector $\underline{X}_P$, and plot (B) shows a corresponding portion of the signal $\underline{Y}_P^{(0)}$ as received. Plot (C) shows a portion of a corresponding initial estimated channel response vector $\underline{H}_P^{(0)}$. In this example, vector $\underline{H}_P^{(0)}$ is calculated according to expression (4.1).

Plot (D) of FIG. 19 shows power values of received signal $\underline{Y}_P^{(0)}$ in relation to a threshold value S70. It can be seen that in this case the second and third values of $\underline{Y}_P^{(0)}$ exceed the threshold and are identified as corrupted. Plot (E) shows the corresponding portion of modified estimated channel response vector $\underline{H}_P^{(1)}$ in which new values (open circles) are interpolated at the corrupted positions based on neighboring values of the initial channel response estimate. (Although plots (C) and (E) correspond to the same portion of the symbol, the vertical axes of the two plots are scaled differently.)

Plot (F) of FIG. 19 shows a portion of reference signal $\underline{Y}_R^{(1)}$. In this example, vector $\underline{Y}_R^{(1)}$ is calculated from portions as shown in plots (A) and (E) according to the frequency-domain expression $\underline{Y}_R^{(1)} = \underline{H}_P^{(1)} \underline{X}_P$. Plot (G) shows a corresponding portion of noise estimate vector $\underline{I}_P^{(1)}$, which is calculated according to the expression $\underline{I}_P^{(1)} = \underline{Y}_P^{(0)} - \underline{Y}_R^{(1)}$. Values for other elements of noise estimate vector $\underline{I}^{(1)}$ may be interpolated from the values of $\underline{I}_P^{(1)}$ as described herein and as illustrated, for example, in FIGS. 17A and 17B. A compensated signal $Y^{(1)}$ based on the noise estimate may then be obtained according to, for example, the frequency-domain expression $\underline{Y}^{(1)} = \underline{Y}^0 - \underline{I}^{(1)}$.

Figure 20:
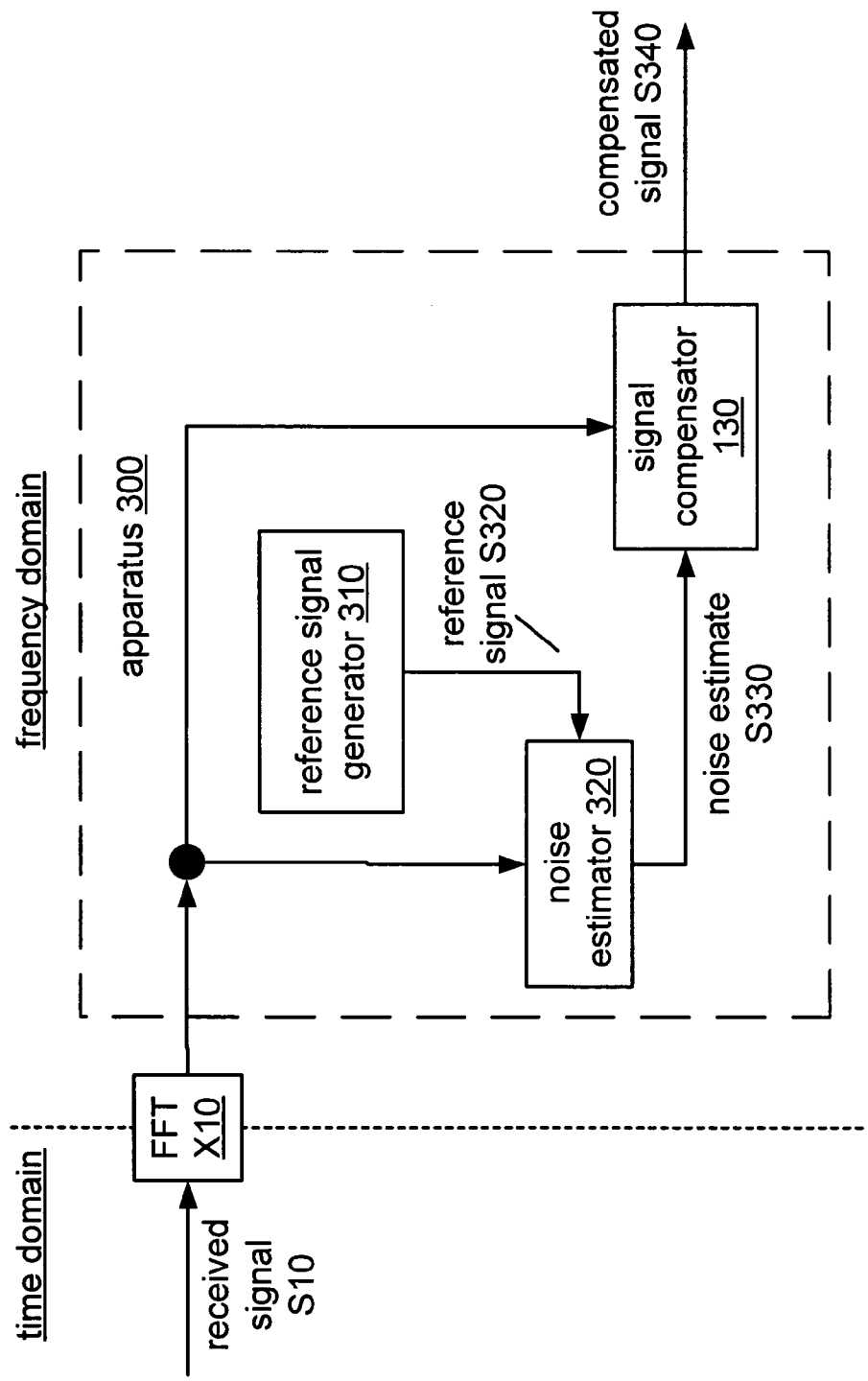
FIG. 20 shows a block diagram of an implementation 300 of apparatus 100.

FIG. 20 shows a block diagram of an implementation 300 of apparatus 100 that is configured to operate on values in the frequency domain. Transform block X10 may be configured as part of apparatus 300 or as a separate element or process. Implementation 310 of reference signal generator 110 is configured to calculate an instance S320 of reference signal S20 (based, for example, on received signal S10). Implementation 320 of noise estimate calculator 120 is configured to calculate an instance S330 of noise estimate S30 based on reference signal S320 and at least a portion of received signal S10. Signal compensator 130 is configured to calculate an instance S340 of compensated signal S40 based on noise estimate S330 and received signal S10.

FIG. 21 shows a block diagram of an implementation 302 of apparatus 300. Reference signal generator 312 and noise estimate calculator 322 are implementations of reference signal generator 310 and noise estimate calculator 320, respectively.

Reference signal generator 312 includes a channel response estimator 110 that is configured to calculate an estimated response of the transmission channel (which may be based, for example, on the received signal). For example, channel response estimator 105 may be configured to calculate an initial estimated channel response $\underline{H}^{(0)}$ according to expression (4.1) or another operation as described herein.

Power calculator 255 is configured to calculate the magnitude squared of the received signal or a portion thereof (e.g. values corresponding to carriers in set P). In another implementation, power calculator 255 may be configured to apply a window to the received signal as described herein. Comparator 260 is configured to compare the power values to a threshold S70 as described herein to identify corrupted carriers. For example, comparator 260 may be configured to output a logical (e.g. binary) indication of which carriers of a symbol are corrupted.

Interpolator 270 is configured to interpolate new estimated channel response values for the carriers that are identified as corrupted according to comparator 260 and to produce a modified estimated channel response vector $\underline{H}_P^{(1)}$. Such interpolation may be linear (for example, between the nearest uncorrupted carriers in set P on each side) or according to a higher-order polynomial or other function.

Combiner 235 is configured to produce an output that is based on both of its inputs. In this example, combiner 235 is configured to combine the modified channel response $\underline{H}_P^{(1)}$ with a pattern S50 to obtain a reference signal in the frequency domain. Pattern S50, which is a known portion of the transmitted signal such as the pilot signal pattern $\underline{X}_P$, may be stored, generated, and/or received from another device. Combiner 235 may be implemented as a multiplier arranged to perform an element-by-element multiplication of the frequency-domain vectors $\underline{H}_P^{(1)}$ and $\underline{X}_P$ to obtain a reference signal $\underline{Y}_R^{(1)}$.

Noise estimator 322 includes a combiner 280 configured to subtract reference signal S322 from a corresponding portion of the received signal S10 (e.g. $\underline{Y}_P$) to produce a noise estimate vector $\underline{I}_P^{(1)}$. Interpolator 290 is configured to produce noise estimate vector $\underline{I}^{(1)}$ by interpolating, from values in $\underline{I}_P^{(1)}$, values for carriers not represented in $\underline{I}_P^{(1)}$ (e.g. traffic carriers). Signal compensator 130 is configured to calculate a compensated signal $\underline{Y}^{(1)}$ according to an expression such as $\underline{Y}^{(1)}=\underline{Y}^{(0)}-\underline{I}^{(1)}$.

It may be desired to estimate data values carried by the received signal based on the noise estimate. FIG. 22A shows a flowchart of a method M400 according to such an embodiment. Method M400 includes an implementation of method M100 as described herein and an equalization task T600. Task T600 equalizes compensated signal $\underline{Y}^{(1)}$ according to the estimated channel response $\underline{H}^{(1)}$ to obtain estimated transmitted signal $\underline{X}^{(1)}$. In one example, task T600 obtains an estimate of the transmitted symbol $\underline{X}$ via a one-tap equalization operation according to an expression such as $\underline{X}^{(1)}=(H^{(1)})^{-1}\underline{Y}^{(1)}$, where $H^{(1)}=\text{diag}(\underline{H}^{(1)})$. Task T600 may also be implemented to include decoding of an error-correcting code in the equalized signal to estimate data values carried by corrupted traffic carriers of the received signal (e.g. carriers between or near to pilots that were identified as corrupted in task T110).

Depending on the particular implementation of method M100, task T600 may include performing an interpolation operation (e.g. via linear interpolation or a curve-fitting operation such as polynomial, spline, etc.) to obtain values of the estimated channel response $\underline{H}^{(1)}$ for carriers not in set P. FIG. 23A shows a plot of amplitude vs. frequency for an estimated channel response vector $\underline{H}$. The filled circles indicate values corresponding to carriers in set P, and the open circles indicate values for other carriers as calculated via linear interpolation. FIG. 23B shows a similar plot in which the open circles indicate values for other carriers as calculated via a higher-order interpolation operation such as curve-fitting. Although for ease of illustration FIGS. 23A and 23B show plots of real-valued vectors, in practice an estimated channel response vector $\underline{H}$ would typically have complex values.

FIG. 22B shows a flowchart of an implementation M410 of method M400. Method M410 includes a task T500 that re-estimates the channel response according to the compensated signal. For example, task T500 may be configured to calculate a re-estimated channel response based on the compensated signal and known transmitted values according to an expression such as $\underline{H}_P^{(2)}=\underline{Y}_P^{(1)}/\underline{X}_P$. Alternatively, task T500 may be implemented to apply any of the other channel response estimation techniques disclosed herein, and it is not necessary for tasks T100 and T500 to use the same technique.

In one example, task T100 obtains the estimate $\underline{H}_P^{(1)}$ according to the expression $\underline{H}_P^{(1)}=\underline{Y}_P^{(0)}/\underline{X}_P$, and task T500 re-estimates the channel response according to the expression $\underline{H}_P^{(2)}=\underline{Y}_P^{(1)}/\underline{X}_P$. In another example, task T100 obtains the estimate $\underline{H}_P^{(1)}$ using an inverse transform or predictive technique as described herein, and task T500 re-estimates the channel response according to the expression $\underline{H}_P^{(2)}=\underline{Y}_P^{(1)}/\underline{X}_P$. Task T500 may include a subtask to obtain values of $\underline{H}^{(2)}$ for carriers not in set P (e.g. traffic channels). This subtask may include an interpolation operation, and the values of $\underline{H}^{(2)}$ may also be based on traffic channel values from $\underline{H}^{(1)}$ if available.

Method M410 also includes an implementation T610 of equalization task T600 as described herein, which equalizes compensated signal $\underline{Y}^{(1)}$ according to the re-estimated channel response $\underline{H}^{(2)}$ to obtain estimated transmitted signal $\underline{X}^{(1)}$. In one example, task T610 obtains an estimate of the transmitted symbol $\underline{X}$ via a one-tap equalization operation according to an expression such as $\underline{X}^{(1)}=(H^{(2)})^{-1}\underline{Y}^{(1)}$, where $H^{(2)}=\text{diag}(\underline{H}^{(2)})$. Task T610 may include a subtask to obtain values of $\underline{H}^{(2)}$ for carriers not in set P (e.g. traffic channels). This subtask may include an interpolation operation, and the values of $\underline{H}^{(2)}$ may also be based on traffic channel values from $\underline{H}^{(1)}$ if available.

FIG. 22C shows a flowchart of a method M500 according to an embodiment. In method M500, tasks T200, T300, and T400 are re-iterated using $\underline{H}_P^{(2)}$ (or $\underline{H}^{(2)}$) as the estimated channel response. Such a process of re-estimation and iteration may be repeated as many times as desired before equalization task T610 is performed using the current estimated channel response.

Figure 24:
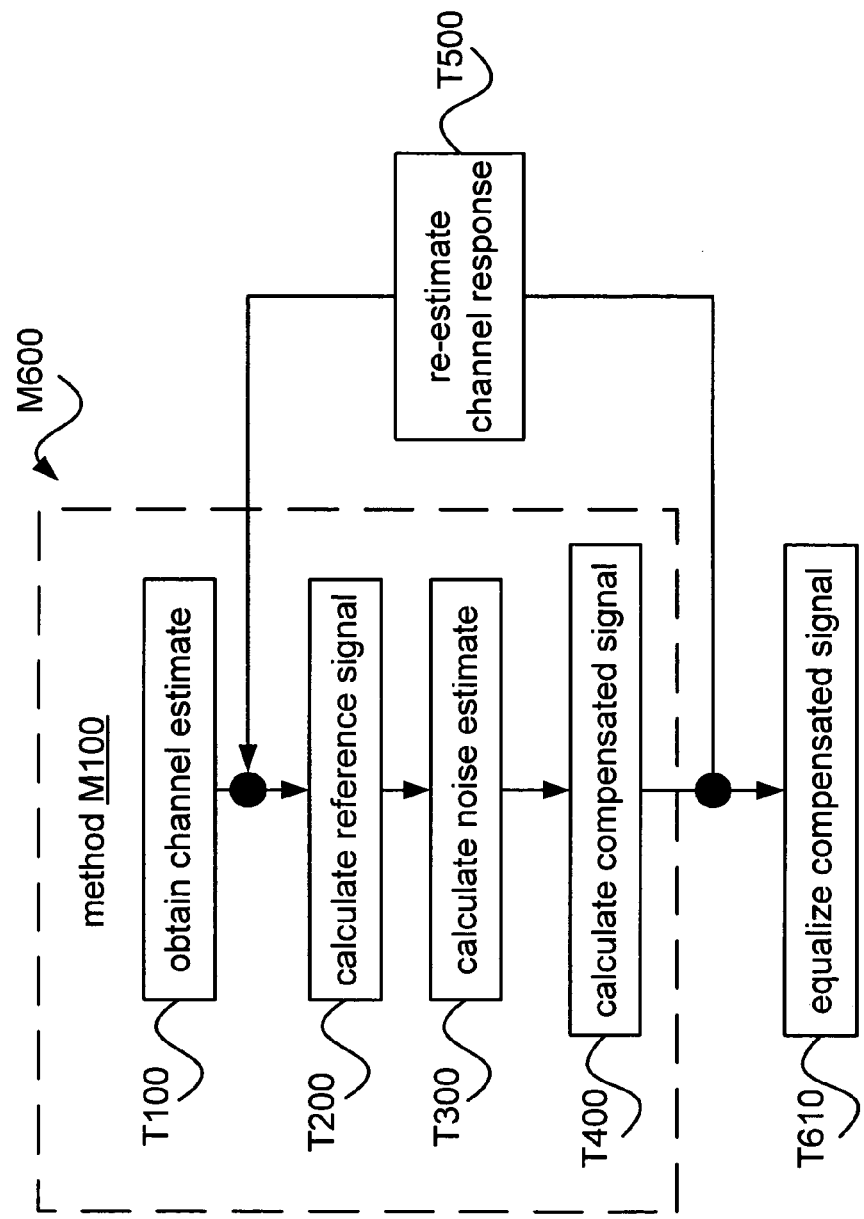
FIG. 24 shows a flowchart of a method M600 according to an embodiment.

FIG. 24 shows a flowchart of a method M600 according to an embodiment which differs from method M500 in that the channel response is not re-estimated after the final iteration. An apparatus 100 as described herein may also be configured to perform an implementation of method M400, M500, or M600 by including, for example, an equalizer (such as a one-tap equalizer) and appropriate decision logic for iteration control and data signal direction.

Different iterations of channel response re-estimation task T500 may use different channel estimation techniques. Different implementations of method M100 may also be used in different iterations. For example, one iteration may include an implementation of method M200 (e.g. to calculate a noise estimate in the time domain), while a preceding and/or subsequent iteration on the same symbol may include an implementation of method M300 (e.g. to calculate a noise estimate in the frequency domain).

Embodiments as described above include methods and apparatus configured to compensate a received signal according to a noise estimate. A method M700 according to a further embodiment compensates a received signal S10 according to values of a calculated model of the received signal.

Figure 25:
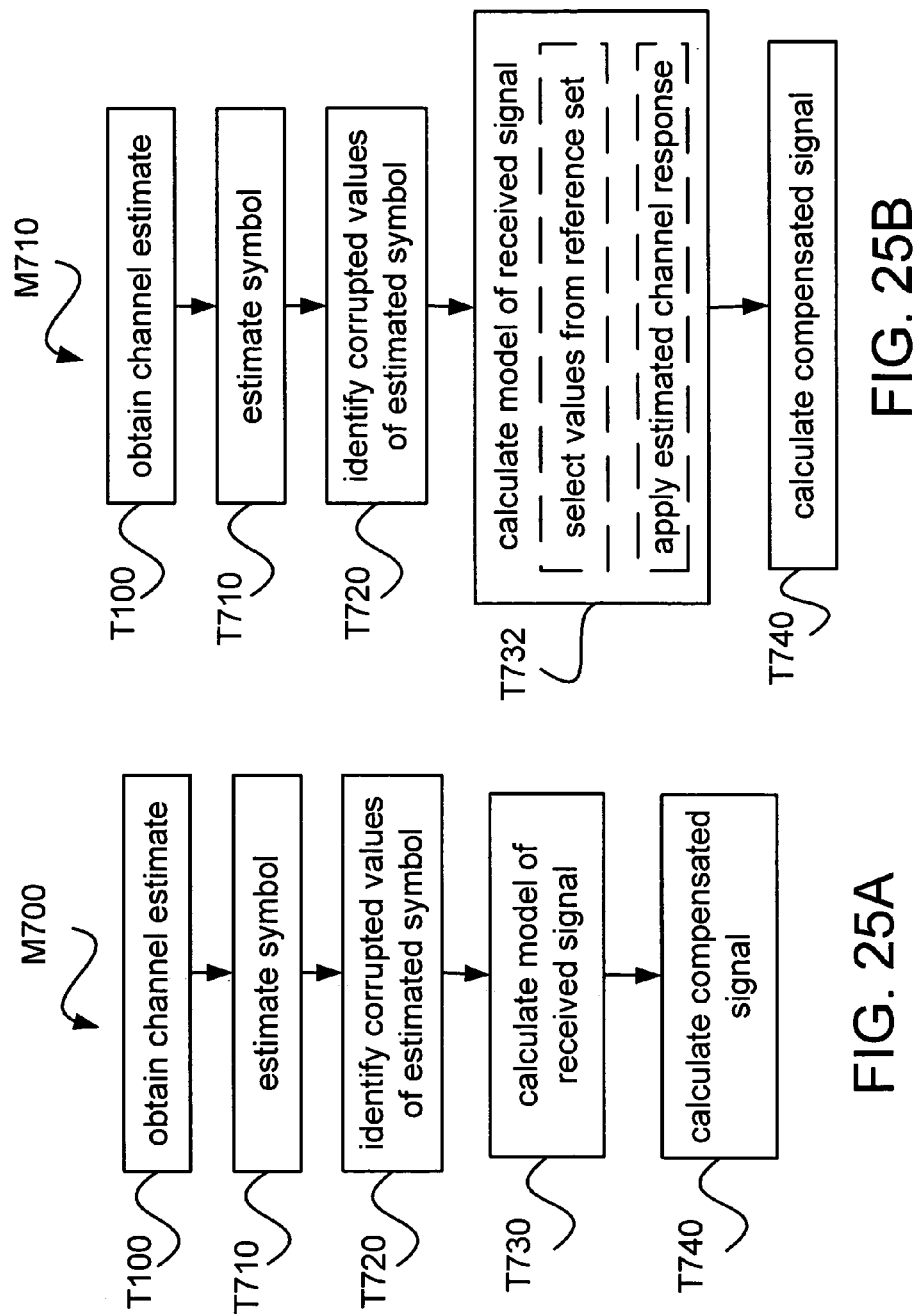
FIG. 25A shows a flowchart for a method M700 according to an embodiment.
FIG. 25B shows a flowchart for an implementation M710 of method M700.

FIG. 25A shows a flowchart for an implementation of method M700. Task T100 obtains an estimated response $\underline{H}_a$ of the transmission channel according to any channel response estimation procedure as described herein. Task T710 estimates a symbol X carried by the received signal S10. Task T720 identifies one or more corrupted values of the estimated symbol. Task T730 calculates a model $s_m$ of the received signal based on the estimated symbol, an estimated response of the transmission channel, and a set of reference values. Task T740 compensates the received signal S10 based on the locations of the corrupted values and according to values of the calculated model $s_m$.

Task T710 may be configured to estimate the symbol X by applying an estimated response of the transmission channel to the received signal Y. For example, task T710 may be configured to perform an equalization operation on the received signal. In one such example, task T710 calculates an estimate S of the transmitted symbol $\underline{X}$ via a one-tap equalization operation according to an expression such as $\underline{S}=(H_a)^{-1}\underline{Y}$, where $H_a=\mathrm{diag}(\underline{H}_a)$.

Task T720 may be configured to identify one or more corrupted values of the estimated symbol by comparing time-domain values $s_k$ of the estimated symbol S to a threshold value S80. A comparison to threshold S80 may be performed for each value $s_k$ of the estimated symbol. In one example, threshold S80 is compared to the power (e.g. the magnitude squared) of each time-domain value of an estimated symbol s. Values that are greater than threshold S80 (or, alternatively, not less than threshold S80) are identified as corrupted. In other examples, the comparison may be performed upon a measure of each time-domain value other than the power (such as a logarithm of the value).

Alternatively, threshold S80 may be compared to a measure relating to a set of values $s_k$ within a window, such as a sum of the squared magnitudes of the values in the window. The width of the window in time—which may be greater than, equal to, or less than the width of the symbol—may be selected according to an estimated duration of an impulse noise event. In one such example, the threshold S80 is compared to the average signal power of the estimated symbol over the width of the window. In another such example, the threshold S80 is compared to the total signal power of the estimated symbol over the width of the window. If the measure of the window is greater than threshold S80 (or, alternatively, not less than threshold S80), the values within the window are identified as corrupted. Alternatively, a value may be identified as corrupted if it falls within at least a certain number of windows identified as corrupted. Adjacent windows may be overlapping such that a value may fall within more than one window, or nonoverlapping such that each value is within only one window.

It may be desirable to obtain the value of threshold S80 according to one or more signal conditions. Threshold S80 may be derived from a measure of the power of received signal S10, or from a measure of the power of a portion of signal S10 (for example, received pilot signals). For example, threshold S80 may be based on an estimate $\hat{\sigma}_{ha}^2$ of the average channel power per sample, which may be calculated according to an expression such as the following:

$$\hat{\sigma}_{h0}^2 = \underset{p \in P}{\mathrm{avg}}\{|H^{(0)}(p)|^2\}. \quad (5.1)$$

The average may be taken over all subcarriers of the symbol for which a value of $\underline{H}_a$ is available, or over a set P of the subcarriers of the symbol (for example, the set of pilot signals). The averaging in expression (5.1) may be calculated using a mean or a median. Alternatively, threshold S80 may be based on a measure of channel power calculated using another statistical filter, Expression (5.1) may also be calculated using a channel response estimate other than $\underline{H}_a$, such as a refined version of $\underline{H}_a$ (such as a filtered and/or interpolated version), a precursor of $\underline{H}_a$, or an estimate that is calculated independently of $\underline{H}_a$.

Threshold S80 may include a weighting factor. In one example, threshold S80 has the value $w_1 \hat{\sigma}_{ha}^2$, where $w_1$ is a weighting factor that may be selected to balance desired detection rate against probability of false alarm for signals with high power. In one example, the value of $w_1$ is 25.

It may be desirable to vary the value of threshold S80 according to a selection from among a set of predetermined values. For example, the value of $w_1$ may be selected according to a match between a current signal characteristic and one of a set of models. Alternatively, threshold S80 or a factor thereof may be fixed at a value obtained, for example, according to a selection and/or calculation as described herein.

Task T720 may be configured to output an indication of the time-domain locations within the estimated symbol that have been identified as corrupted. In one example, task T720 calculates a binary-valued vector or mask q according to the following expression for $k \in \{0,1,\ldots, M-1\}$:

$$q(k) = \begin{cases} 1, & |s(k)|^2 > S80 \\ 0, & \text{otherwise} \end{cases}. \quad (5.2)$$

Information regarding the locations of corrupted values in the estimated symbol may be used to modify the values of corresponding samples of received signal S10. In one naïve approach, a value of zero is assigned to the samples of received signal S10 that correspond to corrupted locations of the estimated symbol. However, simply zeroing a sample of received signal S10 may introduce distortion, especially if the classification of the sample location as corrupted is incorrect.

Task T730 calculates a model of received signal S10 that may be used to modify samples of signal S10 at corrupted locations. Task T730 may be implemented to include a subtask of selecting (or otherwise calculating) a set of frequency-domain values based on a set of reference values. For example, task T730 may be configured to map each value of the estimated symbol S to one of the set of reference values. In such case, task T730 may be configured to perform the mapping by selecting, for each value of the estimated symbol S, the nearest among the set of reference values according to some distance measure (for example, Euclidean distance).

Figure 26:
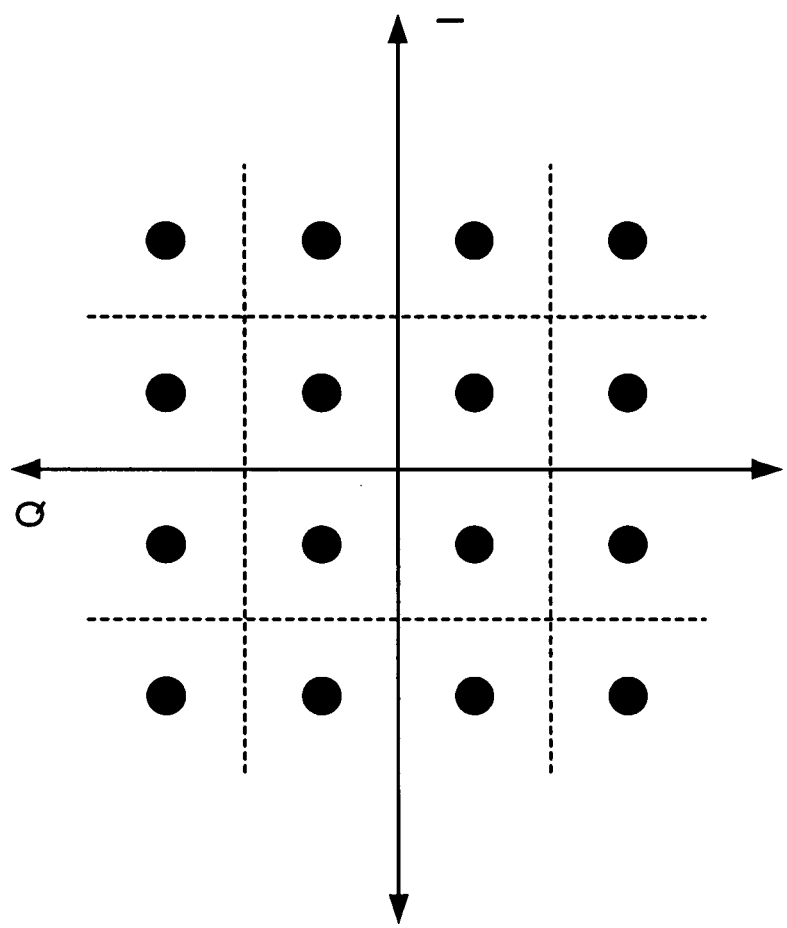
FIG. 26 shows a diagram of a set of constellation points and a division of the I-Q plane into corresponding regions.

A baseband digital communications signal is typically transmitted having one of a finite set of states. It may be desirable for the set of reference values to represent this set of possible transmitted states. For example, the set of reference values may be a set of constellation points as determined by the modulation scheme used to transmit the signal. FIG. 26 shows an example of the set of constellation points in the I-Q plane for a 16-QAM modulation scheme. FIG. 26 also shows a division of the I-Q plane into 16 corresponding regions, such that any point in the plane may be quickly mapped to the appropriate constellation point by comparing its I and Q values with boundary values of the regions along each axis. In such manner, task T730 may be configured to select a frequency-domain value from the set of constellation points for each value of the estimated symbol S.

Task T730 may also include a subtask of applying an estimate $\underline{H}_b$ of the response of the transmission channel to the set of selected (or otherwise calculated) frequency-domain values. Estimate $\underline{H}_b$ may be the same as channel response estimate $\underline{H}_a$, may be a refined version or precursor of estimate $\underline{H}_a$, or may be calculated independently of estimate $\underline{H}_a$. In one example, the estimate $\underline{H}_b$ is obtained from estimate $\underline{H}_a$ by filtering (such as IFFT/FFT filtering) and/or interpolation (for example, from values at pilot carriers). FIG. 25B shows a flowchart for an implementation M710 of method M700 that includes an implementation T732 of task T730 having two subtasks.

Based on received signal S10, task T740 calculates a compensated signal according to values of the calculated model. Task T740 may also be implemented to compensate received signal S10 based on the locations of the corrupted values of the estimated symbol. An implementation T742 of task T740 compensates the received signal S10 by replacing samples of the received signal that correspond to the corrupted values with corresponding values of the model. In one such example, task T742 calculates the compensated signal y$^{(1)}$ according to an expression such as the following:

$$y^{(1)}(k) = \begin{cases} y^{(0)}(k), & q(k) = 0 \\ s_m(k), & q(k) = 1 \end{cases}. \quad (5.3)$$

As shown in FIGS. 22A,B,C and 24 with respect to method M100, method M700 may also be implemented to include further operations, such as equalization of the compensated signal, and/or iteration. For example, one or more tasks of method M700 may be iterated upon a compensated signal S740 (e.g. applying an improved channel estimate and/or symbol estimate), and such iteration may be performed prior to an equalization operation. Method M700 may also be performed in conjunction with (e.g. before or after) an implementation of method M100, M400, M500, or M600 as described herein, whether on the same symbol and/or on consecutive symbols of received signal S10. In a further example, noise estimation task T320 is configured to apply threshold values that are based on corresponding values of a model as calculated in task T730.

Figure 27:
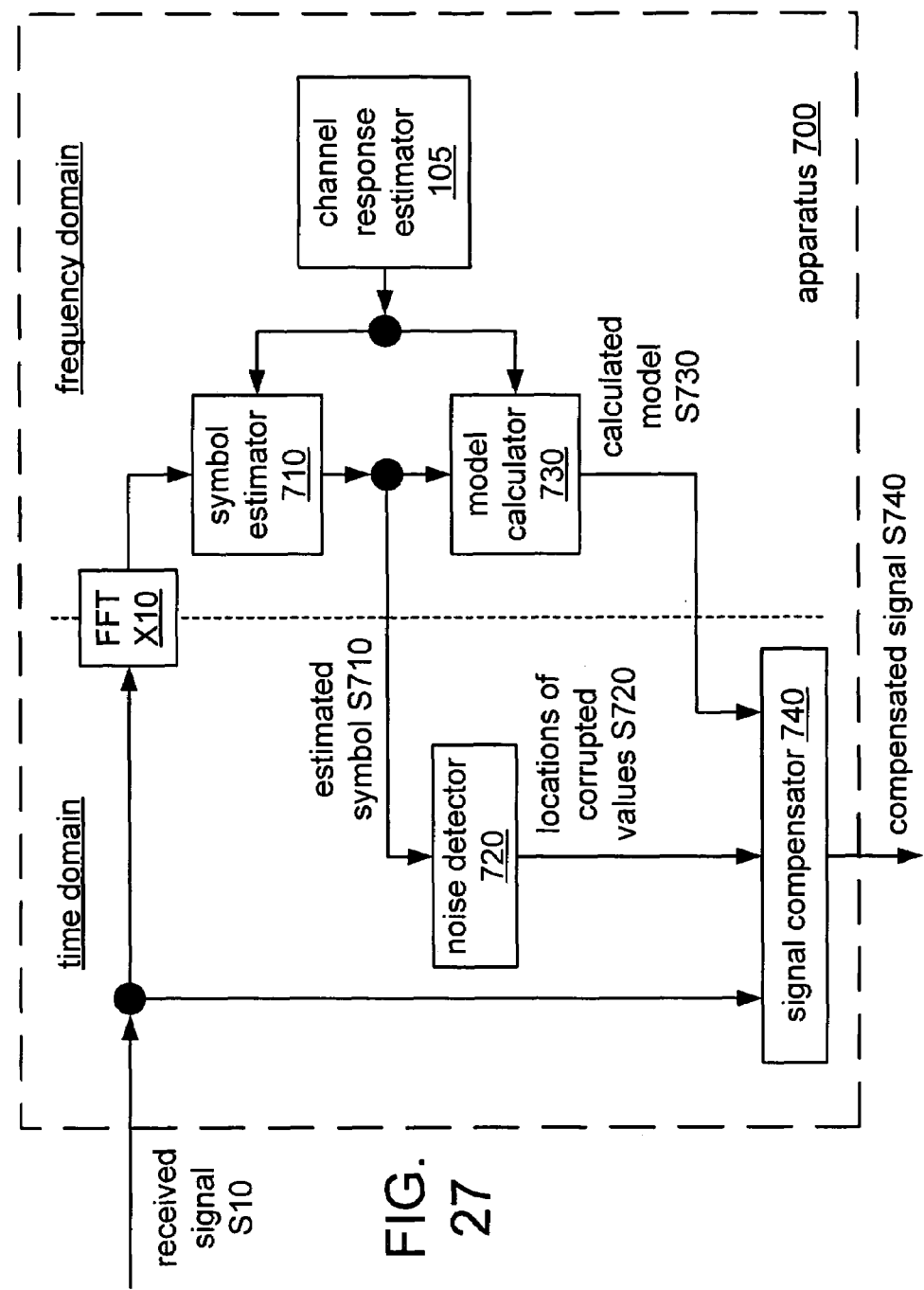
FIG. 27 shows a block diagram of an apparatus 700 according to an embodiment.

FIG. 27 shows a block diagram of an apparatus 700 according to an embodiment that is configured to receive an information signal S10 and to produce a corresponding compensated signal S740. Channel response estimator 105 is configured to calculate an estimated response of the transmission channel according to a channel response estimation procedure as disclosed herein. Symbol estimator 710 is configured to calculate an estimated symbol S710. For example, symbol estimator 710 may perform an implementation of task T710 as disclosed herein. Noise detector 720 is configured to indicate the locations S720 of one or more corrupted values of the estimated symbol S710. For example, noise detector 720 may perform an implementation of task T720 as disclosed herein. Model calculator 730 is configured to calculate a model S730 of the received signal. For example, model calculator 730 may perform an implementation of task T730 as disclosed herein. Signal compensator 740 is configured to produce the compensated signal S40 based on received signal S10, the indicated locations S720, and the calculated model S730. For example, signal compensator 740 may be configured to perform an implementation of task T740 as disclosed herein.

The various elements of apparatus 700 may be implemented as electronic and/or optical devices residing, for example, on the same chip or among two or more chips in a chipset, although other arrangements without such limitation are also contemplated. One or more elements of apparatus 700 may be implemented in whole or in part as one or more sets of instructions executing on one or more fixed or programmable arrays of logic elements (e.g. transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g. a processor used to execute portions of code corresponding to different elements at different times, or an arrangement of electronic and/or optical devices performing operations for different elements at different times).

Figure 28:
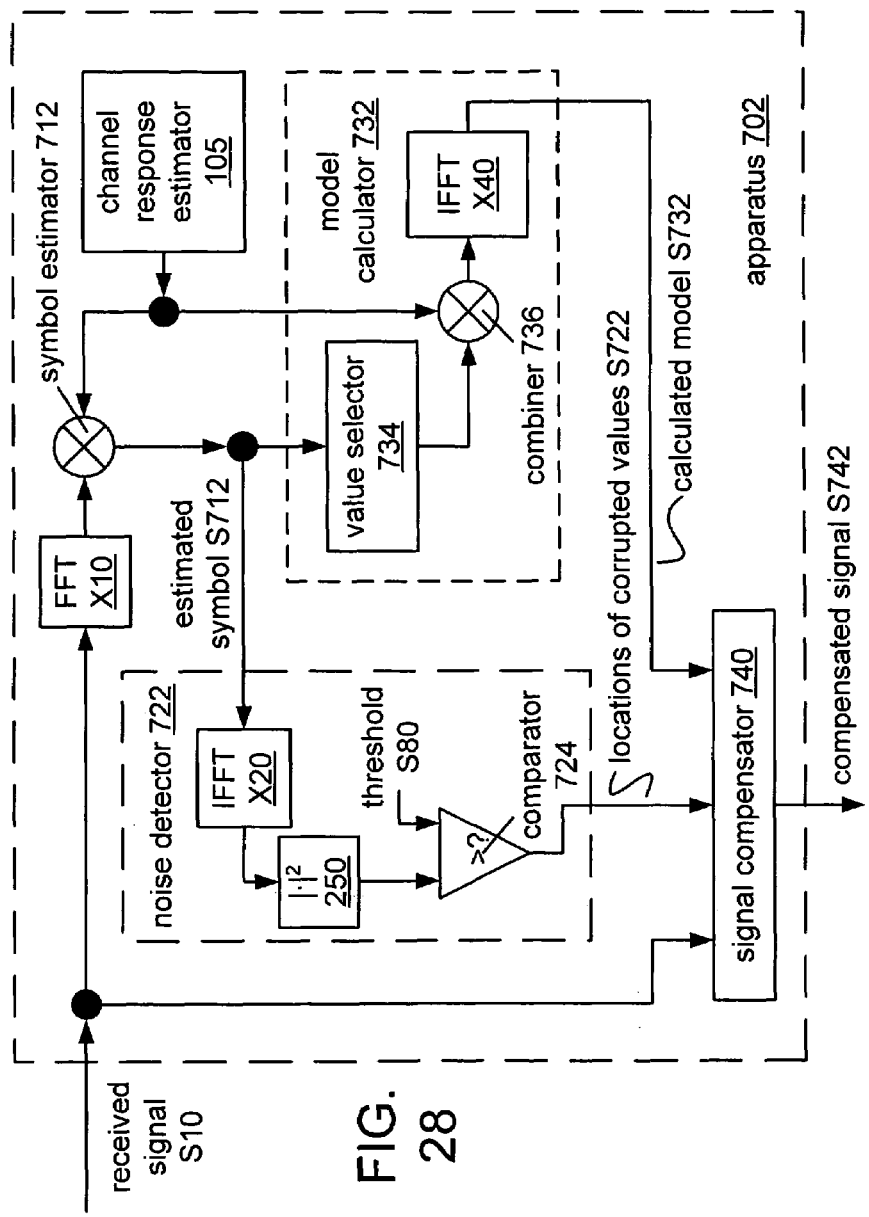
FIG. 28 shows a block diagram of an implementation 702 of apparatus 700.

FIG. 28 shows a block diagram of an implementation 702 of apparatus 700. Symbol estimator 712, noise detector 722, model calculator 732, and signal compensator 742 are implementations of symbol estimator 710, noise detector 720, model calculator 730, and signal compensator 740, respectively.

Symbol estimator 712 includes a combiner configured to equalize received signal S10 according to an estimated channel response. In this example, combiner 712 is configured to combine the channel response estimate $\underline{H}_a$ with received signal S10 to obtain an estimated symbol S712 in the frequency domain. Combiner 712 may be implemented to include a multiplier arranged to perform an element-by-element division (in serial and/or in parallel) of the frequency-domain vector $\underline{Y}$ by the channel estimate $\underline{H}_a$ to obtain the estimated symbol S.

Inverse transform block X20 (as described above) is configured to perform an inverse frequency transform on the estimated symbol S in the frequency domain to obtain values s in the time domain. Inverse transform block X20 may also be configured as a separate element or process, such that a system including an instance of apparatus 700 may perform an inverse frequency transform using block X20 even if the apparatus 700 is not activated.

Power calculator 250 is configured to calculate the magnitude squared of each time-domain estimated symbol value $s_k$. In another implementation, power calculator 250 may be configured to apply a window to the estimated symbol values as described herein. Comparator 724 is configured to compare the power values to a threshold S80 to identify corrupted values. For example, comparator 724 may be configured to perform an operation as described in expression (5.2). Comparator 724 may be configured to operate on the symbol values in serial and/or in parallel.

Model calculator 732 includes a value selector 734 and a combiner 736. Value selector 734 is configured to select frequency-domain values from a set of reference values, such as a set of constellation points. For example, value selector 734 may be configured to calculate distances between reference values and values of the estimated symbol. Alternatively, value selector 734 may be configured to classify values of the estimated symbol according to a set of region boundaries as shown in the example of FIG. 26.

Combiner 736 is configured to apply an estimated channel response to the selected frequency-domain values. Combiner 736 may be implemented as a multiplier arranged to perform an element-by-element multiplication (in serial and/or in parallel) of the selected frequency-domain values and the estimated channel response to obtain a representation $S_m$ of the calculated model. Inverse transform block X40 may be implemented as another instance of block X20, or blocks X20 and X40 may be implemented as the same structure or process operating on different signals at different times.

Although some implementations may be configured such that the estimated channel responses used by symbol estimator 712 and by combiner 736 are the same or are derived one from the other, apparatus 700 may also be implemented such that these two elements apply different channel estimates. Signal compensator 742 is implemented to perform a selective replacement operation upon received signal S10 according to, for example, expression (5.3) above.

Expressions describing operations in one example of method M200 may be generalized to the n-th iteration of an iterative implementation as follows:

$$\underline{Y}_R^{(n)} = H_P^{(n)} \underline{X}_P;$$

$$\underline{y}_N^{(n)} = \underline{y}^{(0)} - \underline{y}_R^{(n)};$$

$$\underline{i}^{(n)} = f(\underline{y}_N^{(n)});$$

$$\underline{Y}^{(n)} = \underline{Y}^{(0)} - \underline{I}^{(n)},$$

where the function $f$ indicates an operation identifying corrupted values as described herein in relation to task T320.

Expressions describing operations in one example of method M300 may be generalized to the n-th iteration of an iterative implementation as follows:

$\underline{H}_P^{(n)} = g_1(\underline{Y}_P^{(n-1)});$ $\underline{Y}_D^{(n)} = H_P^{(n)} \underline{X}_P;$ $\underline{I}_P^{(n)} = \underline{Y}_P^{(0)} - \underline{Y}_R^{(n)};$ $\underline{I}^{(n)} = g_2(\underline{I}_P^{(n)});$ $\underline{Y}^{(n)} = \underline{Y}^{(0)} - \underline{I}^{(n)},$ where the functions $g_1$ and $g_2$ indicate an operation identifying corrupted carriers as described herein in relation to task T110, and a noise estimate derivation operation as described herein in relation to task T310, respectively.

Expressions describing operations in one example of method M700 may be generalized to the n-th iteration of an iterative implementation as follows:

$S = (H_a)^{-1} Y^{(n-1)};$ $q = r_1(s);$ $S_m = r_2(S);$ $Y_m^{(n-1)} = H_b S_m;$ $y^{(n)} = r_3(q, y^{(n-1)}, y_m^{(n-1)})$ (alternatively, $y^{(n)} = r_3(q, y^{(0)}, y_m^{(n-1)})$), where the functions r1, r2, and r3 indicate an operation identifying corrupted values as described herein in relation to task T720, an operation of calculating a model as described herein in relation to task T730, and a replacement operation as described herein in relation to task T740, respectively.

Once an estimate for the transmitted symbol $\underline{X}$ has been obtained, a decision operation may be executed to select the best constellation point (for example, according to a minimum distance criterion) for each element of the estimated transmitted symbol (e.g. according to the modulation scheme used on that subcarrier).

Methods and apparatus as described herein may be used to calculate a compensated symbol based on a corresponding received symbol. Such symbol-by-symbol operation may be repeated for each of a received stream of symbols. In the case of channel response estimation, information from previously received symbols may also be used, as described herein. In further implementations of methods and apparatus as described herein, information regarding noise estimates from previous symbols may also be used. For pulse-like noise events that recur over time, for example, such a method or apparatus may be configured to identify and track a period of such events. Such information may be applied to predict an appropriate implementation of method M100 for a particular symbol and may help to reduce power consumption by distributing processing cycles more optimally over time.

Narrowband interference events may also be correlated over time. For example, such an event may affect approximately the same set of carriers in adjacent symbols and/or recur on those frequencies according to some period of time. In such a case, it may be desirable to use noise estimate information in an operation on one or more following symbols. For example, such an implementation of a method or apparatus as described herein may be configured to subtract the noise estimate $\underline{I}$ or $\underline{I}_P$ from a subsequent received symbol before calculation of an initial and/or modified channel estimate for that symbol. In another example, an implementation of a method or apparatus as described herein may be configured to exclude pilots identified as corrupted in a previous symbol from the calculation of threshold S60, S70, and/or S80. Such techniques may support improved decoding of corrupted frequencies, especially in cases where the channel response is otherwise relatively constant over time.

Depending on the particular scheme in which a method or apparatus according to an embodiment is applied, the transmitted power of a pilot component may differ from that of a traffic component. In a DVB system, for example, the power of a pilot carrier is equal to 4/3 the power of a traffic carrier. It may be desirable to account for such a factor in interpolating traffic carrier values, such as noise estimate and/or estimated channel response values, from pilot carrier values.

In a further embodiment, an implementation of method M200 is performed in which it is assumed that the reference signal or deterministic component is zero. For example, tasks T100 and T200 may be omitted such that the noise estimate is calculated directly from the received signal (e.g. by thresholding the received signal in the time domain). The channel estimate obtained in this method is then applied as the initial channel estimate in an instance of method M100, M400, M500, M600, or M700.

An implementation of method M500 or M600 may include an equalization operation in the iteration, such that the vector of transmitted signals $\underline{X}$ in a second or later pass may include components from traffic signals as well as pilot signals. It may also be desirable to obtain a new estimate for $\underline{X}$ by performing error-correcting decoding and subsequent re-encoding (for example, error detection, error correction, and/or redundancy coding operations, such as encoding, puncturing, and/or interleaving) on an estimate of $\underline{X}$ from the previous iteration.

Whether and/or how an impulse noise estimation method as described herein is performed may be selected depending on other factors in the operating environment, such as one or more characteristics of the received signal and/or a level of available supply power or energy. For example, further embodiments include systems, methods, and apparatus in which one or more tasks and/or elements are activated or deactivated (e.g. further iteration in an implementation of method M500 or M600) based on a detected Doppler frequency of a received signal, and/or in which the complexity of one or more tasks or elements (e.g. the complexity of an interpolation operation or the nature of a channel response estimation task) is varied based on a detected Doppler frequency of a received signal. Such an embodiment may activate or deactivate an impulse noise estimation method M100 or M700 based on the detected Doppler frequency. In at least some implementations, such selection may offer advantages of power conservation, which is typically an important concern in battery-operated (e.g. handheld) and heat-transfer-restricted applications.

One or more of the elements of apparatus 100 or 700 may be implemented as an array of logic elements such as transistors and/or gates. The elements may be implemented together in one chip or across more than one chip. A chip including one or more such elements may also include arrays configured to perform other processing functions on the received signal such as Viterbi decoding, Reed-Solomon forward error correction, etc.

An implementation of apparatus 100 or 700 may be configured using elements having one or more structures to perform corresponding addition, subtraction, multiplication, division, comparison, weighting, and other component mathematical and/or logical operations to support vector, matrix, and other computations and decisions. Such structures may be implemented in hardware, software, and/or firmware.

Some or all of such structures or elements may also be shared with other methods and/or apparatus in a device or system.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of signal processing, said method comprising:
   based on a multicarrier signal received over a transmission channel, estimating a response of the transmission channel using a channel response estimator; and
   estimating a plurality of data values carried by the received multicarrier signal, said estimating including:
      calculating a reference signal using a reference signal generator based on the estimated response of the transmission channel and a known pattern of data values carried by the received multicarrier signal;
      based on a time-domain difference between the reference signal and a portion of the received multicarrier signal carrying the plurality of data values, calculating a noise estimate using a noise estimate calculator; and
      in a frequency domain and according to the noise estimate, compensating the portion of the received multicarrier signal carrying the plurality of data values using a signal compensator.

2. The method of signal processing according to claim 1, wherein said calculating a reference signal is based on the estimated response of the transmission channel and a known pattern of data values carried by pilot carriers of the received multicarrier signal.

3. The method of signal processing according to claim 1, wherein said calculating a noise estimate includes identifying corrupted values of the time-domain difference.

4. The method of signal processing according to claim 3, wherein said identifying corrupted values includes performing, for each value of the time-domain difference, a comparison to a threshold value.

5. The method of signal processing according to claim 3, wherein said identifying corrupted values includes deriving a plurality of measures from the values of the time-domain difference and comparing each of the plurality of measures to a threshold value.

6. The method of signal processing according to claim 1, wherein said compensating includes subtracting the noise estimate from the portion of the received multicarrier signal carrying the plurality of data values.

7. A method of signal processing, said method comprising:
   estimating a symbol carried by a multicarrier signal received over a transmission channel using a symbol estimator;
   based on the estimated symbol, a set of reference values, and an estimated response of the transmission channel, calculating a model of the portion of the received multicarrier signal carrying the symbol using a model calculator;
   in a time domain, identifying corrupted values of the estimated symbol using a noise detector; and
   based on the locations of the corrupted values, compensating the received multicarrier signal according to values of the calculated model using a signal compensator.

8. The method of signal processing according to claim 7, wherein the estimated response of the transmission channel is based on the received multicarrier signal.

9. The method of signal processing according to claim 7, wherein said calculating a model includes selecting one among the set of reference values for each frequency-domain value of the estimated symbol.

10. The method of signal processing according to claim 7, wherein said calculating a model includes selecting one among a set of constellation points for each value of the estimated symbol.

11. The method of signal processing according to claim 10, wherein said calculating a model includes selecting, for each value of the estimated symbol, the nearest among the set of constellation points.

12. The method of signal processing according to claim 7, wherein said identifying corrupted values includes performing, for each value of the estimated symbol, a comparison to a threshold value.

13. The method of signal processing according to claim 7, wherein said identifying corrupted values includes deriving a plurality of measures from the values of the estimated symbol and comparing each of the plurality of measures to a threshold value.

14. The method of signal processing according to claim 7, wherein said compensating includes replacing samples of the received multicarrier signal with corresponding values of the calculated model.

15. The method of signal processing according to claim 7, said method comprising equalizing the compensated received multicarrier signal according to an estimated response of the transmission channel.

16. A method of signal processing, said method comprising:
   estimating a response of a transmission channel using a response estimator;
   identifying at least one corrupted component of a multicarrier signal received over the transmission channel using a comparator;
   for each identified corrupted component, modifying the estimated response of the transmission channel at a frequency corresponding to the corrupted component using an interpolator; and
   estimating a plurality of data values carried by the received multicarrier signal, said estimating including:
      calculating a reference signal using a reference signal generator based on the modified estimated response of the transmission channel and a known pattern of data values carried by the received multicarrier signal;
      based on a difference between the reference signal and a portion of the received multicarrier signal carrying the known pattern, calculating a noise estimate using a noise estimator; and
      according to the noise estimate, compensating the portion of the received multicarrier signal carrying the plurality of data values using a signal comparator.

17. The method of signal processing according to claim 16, wherein the estimated response of the transmission channel is based on the received signal.

18. The method of signal processing according to claim 16, wherein said modifying an estimated response of the transmission channel at a frequency corresponding to the corrupted component includes calculating a replacement value for the estimated response at the frequency corresponding to the corrupted component.

19. The method of signal processing according to claim 18, wherein said calculating a replacement value comprises interpolating the replacement value based on values of the estimated response at other frequencies.

20. The method of signal processing according to claim 16, wherein said calculating a reference signal is based on a known pattern of data values carried by pilot carriers of the received signal.

21. The method of signal processing according to claim 16, wherein said calculating a noise estimate is based on a difference between the reference signal and a portion of the received signal including a plurality of pilot carriers.

22. The method of signal processing according to claim 21, wherein said calculating a noise estimate includes interpolating values of the noise estimate at frequencies other than those of the pilot carriers.

23. The method of signal processing according to claim 16, wherein said compensating includes subtracting the noise estimate from the portion of the received multicarrier signal carrying the plurality of data values.

* * * * *